United States Patent
Sadhwani et al.

(10) Patent No.: US 10,129,566 B2
(45) Date of Patent: Nov. 13, 2018

(54) STANDARD-GUIDED VIDEO DECODING PERFORMANCE ENHANCEMENTS

(71) Applicant: Microsoft Technology Licensing, LLC, Redmond, WA (US)

(72) Inventors: Shyam Sadhwani, Bellevue, WA (US); Yongjun Wu, Bellevue, WA (US); Wenbo Zhang, Sammamish, WA (US); Sudhakar V. Prabhu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 22 days.

(21) Appl. No.: 14/720,722

(22) Filed: May 22, 2015

(65) Prior Publication Data
US 2016/0277769 A1    Sep. 22, 2016

Related U.S. Application Data

(60) Provisional application No. 62/133,914, filed on Mar. 16, 2015.

(51) Int. Cl.
*H04N 7/12* (2006.01)
*H04N 19/70* (2014.01)
(Continued)

(52) U.S. Cl.
CPC ........... *H04N 19/70* (2014.11); *H04N 19/127* (2014.11); *H04N 19/44* (2014.11); *H04N 19/46* (2014.11); *H04N 21/85406* (2013.01)

(58) Field of Classification Search
CPC .. H04N 21/85406; H04N 19/46; H04N 19/44; H04N 19/127; H04N 19/70
See application file for complete search history.

(56) References Cited

U.S. PATENT DOCUMENTS 6,470,034 B1    10/2002  Tan
6,631,403 B1 *  10/2003  Deutsch ............ G06F 17/30017
                                                    348/E5.006
(Continued)

FOREIGN PATENT DOCUMENTS

CN    101640795    2/2010
CN    101720040    6/2010
(Continued)

OTHER PUBLICATIONS

Boyce et al., "SEI message for sub-bitstream profile & level indicators," JCTVC-I0231, 7 pp. (Apr. 2012).
(Continued)

*Primary Examiner* — Sathyanaraya V Perungavoor
*Assistant Examiner* — Peet Dhillon
(74) *Attorney, Agent, or Firm* — Klarquist Sparkman, LLP

(57) ABSTRACT

Disclosed herein are innovations in decoding compressed video media data. The disclosed innovations facilitate decoding operations with improved computational efficiency, faster speeds, reduced power, reduced memory usage, and/or reduced latency. In one embodiment, for example, an encoded bitstream of video media data is input from an external video content provider, the encoded bitstream being encoded according to a video codec standard. A decoder is then configured to decode the encoded bitstream based at least in part on supplemental information that identifies a property of the encoded bitstream but that is supplemental to the encoded bitstream (e.g., supplemental information that is not part of the encoded bitstream or its associated media container and that is specific (or related) to the application for which the bitstream is used and/or the standard by which the bitstream is encoded and/or encrypted).

20 Claims, 15 Drawing Sheets

(51) Int. Cl.
*H04N 21/854* (2011.01)
*H04N 19/46* (2014.01)
*H04N 19/127* (2014.01)
*H04N 19/44* (2014.01)

(56) References Cited

U.S. PATENT DOCUMENTS

| | | | |
|---|---|---|---|
| 6,670,996 B2 | 12/2003 | Jiang | |
| 6,742,176 B1* | 5/2004 | Million | G06F 21/10 |
| | | | 717/120 |
| 7,711,938 B2 | 5/2010 | Wise et al. | |
| 8,948,267 B1 | 2/2015 | Khan et al. | |
| 8,948,269 B1 | 2/2015 | Zhao | |
| 2002/0093438 A1 | 7/2002 | Law et al. | |
| 2004/0006575 A1* | 1/2004 | Visharam | H04N 21/23424 |
| 2004/0179619 A1 | 9/2004 | Tian et al. | |
| 2006/0171471 A1 | 8/2006 | Zhou | |
| 2006/0233247 A1* | 10/2006 | Visharam | G11B 27/3027 |
| | | | 375/240.12 |
| 2008/0063085 A1 | 3/2008 | Wu et al. | |
| 2008/0175325 A1* | 7/2008 | Hannuksela | H04N 21/222 |
| | | | 375/240.26 |
| 2008/0279378 A1 | 11/2008 | Ueno | |
| 2011/0299604 A1* | 12/2011 | Price | H04N 19/46 |
| | | | 375/240.26 |
| 2012/0147973 A1 | 6/2012 | Wu et al. | |
| 2012/0195367 A1* | 8/2012 | Kossentini | H04N 19/147 |
| | | | 375/240.02 |
| 2012/0207216 A1 | 8/2012 | Yu et al. | |
| 2012/0278610 A1 | 11/2012 | Waller | |
| 2012/0320967 A1* | 12/2012 | Gao | G10L 25/69 |
| | | | 375/240.02 |
| 2013/0051478 A1 | 2/2013 | Wu et al. | |
| 2013/0070859 A1 | 3/2013 | Lu et al. | |
| 2013/0141642 A1 | 6/2013 | Wu et al. | |
| 2013/0156101 A1 | 6/2013 | Lu et al. | |
| 2013/0215978 A1* | 8/2013 | Wu | H04N 19/46 |
| | | | 375/240.26 |
| 2013/0272430 A1* | 10/2013 | Sullivan | H04N 19/70 |
| | | | 375/240.26 |
| 2014/0086333 A1 | 3/2014 | Wang | |
| 2014/0115472 A1 | 4/2014 | Mochinaga et al. | |
| 2014/0161196 A1 | 6/2014 | Culebro et al. | |
| 2014/0192982 A1 | 7/2014 | Kar et al. | |
| 2014/0314233 A1 | 10/2014 | Evans et al. | |
| 2015/0103888 A1 | 4/2015 | Chen et al. | |
| 2016/0119660 A1 | 4/2016 | Raju et al. | |

FOREIGN PATENT DOCUMENTS

| | | |
|---|---|---|
| CN | 103780352 | 5/2014 |
| KR | 10-2013-0067508 | 6/2013 |
| WO | WO 03/098475 | 11/2003 |
| WO | WO 2011/015054 | 2/2011 |
| WO | WO2014/166412 | 10/2014 |

OTHER PUBLICATIONS

Grunau, "[Ffmpeg-cvslog] Revert h264: skip start code search if the size of the nal unit is known," downloaded from the World Wide Web, 3 pp. (Dec. 2011).

International Search Report and Written Opinion dated Sep. 7, 2016, from International Patent Application No. PCT/US2016/018994, 22 pp.

ISO/IEC CD 23001-7, "Information Technology—MPEG systems technologies—Part 7: Common encryption in ISO base media file format files," 20 pp. (Apr. 2013).

Wiegand et al., "Draft ITU-T Recommendation and Final Draft International Standard of Joint Video Specification (ITU-T Rec. H.264 | ISO/IEC 14496-10 AVC)," JVT-G050r1, 269 pp. (May 2003).

Chang et al., "An Efficient Embedded Bitstream Parsing Processor for MPEG-4 Video Decoding System," *IEEE Int'l Symp. on VLSI Technology, Systems, and Applications*, pp. 168-171 (Oct. 2003).

Ganesh T S, "Intel's Haswell—An HTPC Perspective: Media Playback, 4K and QuickSync Evaluated," downloaded from http://www.anandtech.com/show/7007/intels-haswell-an-htpc-perspective/5, 7 pp. (Jun. 2, 2013).

Intel, "Enabling High-Performance Video Encoding, Decoding, and Preprocessing," downloaded from https://software.intel.com/en-us/articles/enabling-high-performance-video-encoding-decoding-and-preprocessing, 4 pp. (Feb. 9, 2012).

Lehti et al., "Report on the state of the art technologies for hybrid distribution of TV services," Celtic-Plus, H2B2VS D1.1.1, 84 pp. (Nov. 2013).

Sheng et al., "Memory Efficient and Low Complexity Variable Length Decoding for MPEG-4 Applications," *IEEE Int'l Conf. on Parallel Processing Workshops*, 7 pp. (Sep. 2007).

Stancu et al., "Avid: Annotation Driven Video Decoding for Hybrid Memories," *IEEE Symp. on Embedded Systems for Real-time Multimedia*, pp. 2-11 (Oct. 2012).

Sultan et al., "Power Aware Decoding of a Scalable Video bitstream," *Int'l Symp. on Performance Evaluation of Computer & Telecommunication Systems*, pp. 125-130 (Jul. 2009).

Tizon et al., "Report on streaming/broadcast techniques for 3D multi-view video and spatial audio," ROMEO D4.2, 50 pp. (Jul. 2012).

Voica, "Miracast streaming using PowerVR video processors," downloaded from http://blog.imgtec.com/powervr/miracast-streaming-using-powervr-video-processors, 9 pp. (Jan. 6, 2015).

Xu et al., "A Low-power BitStream Controller for H.264/AVC Baseline Decoding," *IEEE European Solid-State Circuits Conf.*, pp. 162-165 (Sep. 2006).

International Preliminary Report on Patentability dated May 9, 2017, from International Patent Application No. PCT/US2016/018994, 12 pp.

Written Opinion of the International Preliminary Examining Authority dated Feb. 8, 2017, from International Patent Application No. PCT/US2016/018994, 9 pp.

\* cited by examiner software 180 implementing one or more
innovations for video decoding

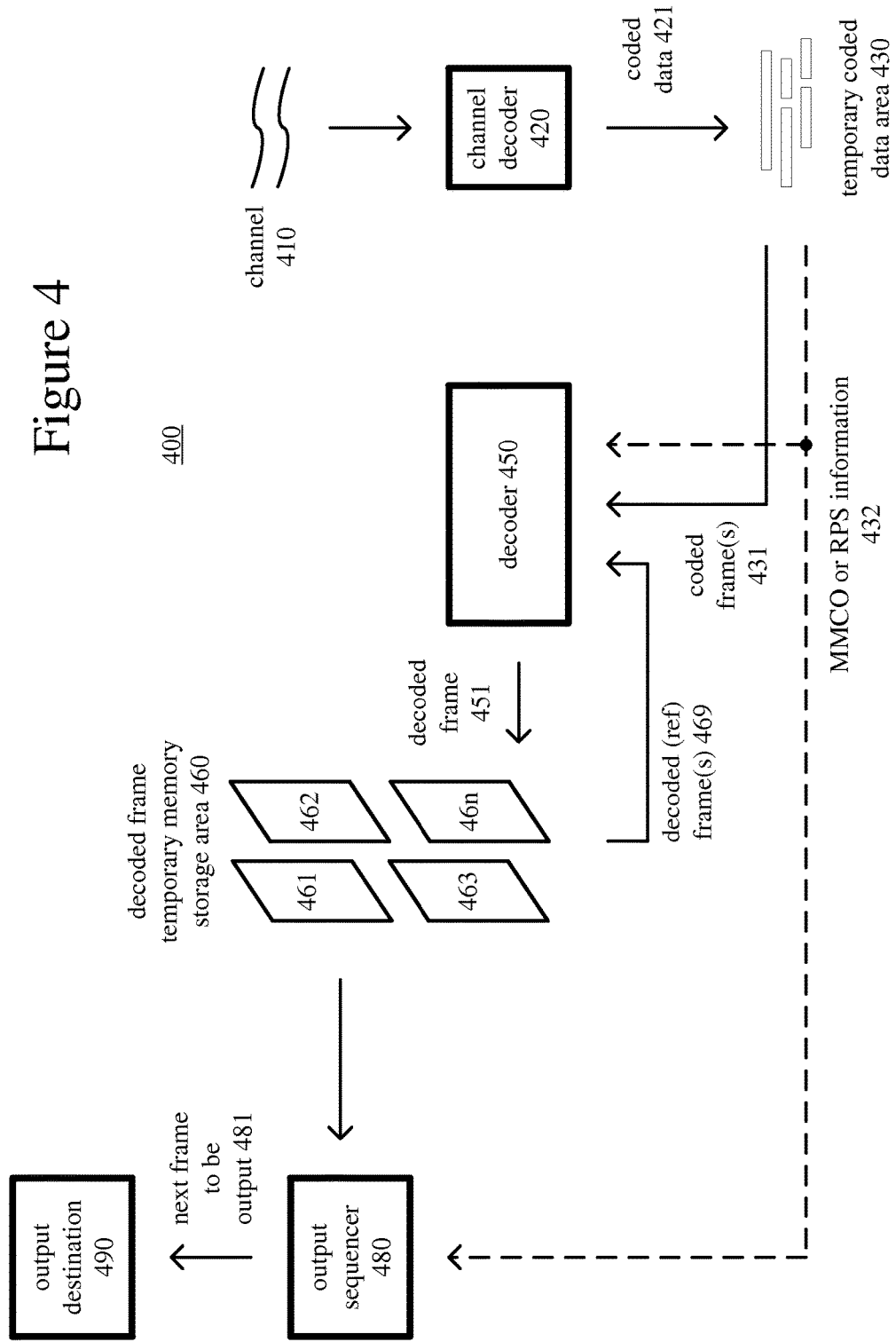

500

600

STANDARD-GUIDED VIDEO DECODING PERFORMANCE ENHANCEMENTS

CROSS-REFERENCE TO RELATED APPLICATIONS

This application claims the benefit of U.S. Provisional Application No. 62/133,914, entitled "APPLICATION-OR STANDARD-GUIDED VIDEO DECODING PERFORMANCE ENHANCEMENTS" and filed on Mar. 16, 2015, which is hereby incorporated by reference herein in its entirety.

FIELD

This application relates to digital video encoding and decoding. In particular, this application relates to improving decoder performance (in terms of, for example, memory usage, computational resources, and/or latency) using application-specific or standard-specific information.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263, and H.264 (MPEG-4 AVC or ISO/IEC 14496-10) standards; the MPEG-1 (ISO/IEC 11172-2) and MPEG-4 Visual (ISO/IEC 14496-2) standards; and the SMPTE 421M (VC-1) standard. More recently, the HEVC standard (ITU-T H.265 or ISO/IEC 23008-2) has been approved. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding.

In practice, however, decoders often perform in suboptimal fashion. For example, in many common scenarios and for many common application, decoder implementations: (1) include dedicated resources that are unnecessary (e.g., memory, such as GPU and/or CPU system memory, that is never used); (2) underutilize or fail to use faster decoding resources (e.g., dedicated or customized hardware decoding resources); and/or or (3) include needless but time-consuming operations (e.g., needless searches for start codes, NALU offsets, picture boundaries, access unit boundaries, and the like).

Embodiments of the disclosed technology are directed to improving decoder performance in view of these shortcomings.

SUMMARY

In summary, the detailed description presents innovations in decoding compressed video media data. The innovations can be implemented as part of a method, as part of a computing device configured or programmed to perform any embodiment of the disclosed decoding techniques, or as part of a tangible computer-readable media storing computer-executable instructions for causing a computing device to perform any embodiment of the disclosed decoding techniques. The various innovations can be used in combination or separately.

In general, the disclosed innovations facilitate decoding operations with improved computational efficiency, faster speeds, reduced power, reduced memory usage, and/or reduced latency. The approaches described herein for controlling decoding operations can be applied when decoding any type of video. Further, the approaches described herein can be employed in a variety of scenarios, such as video playback, video editing, video sharing, or any other scenario in which a video decoder is employed. In one embodiment, for example, an encoded bitstream of video media data is input from an external video content provider, the encoded bitstream being encoded according to a video codec standard. A decoder is then configured to decode the encoded bitstream based at least in part on supplemental information that identifies a property of the encoded bitstream but that is supplemental to the encoded bitstream (e.g., supplemental information that is not part of the encoded bitstream or its associated media container and that is specific (or related) to the application for which the bitstream is used and/or the standard by which the bitstream is encoded or encrypted).

In one example embodiment, an encoded bitstream of video media data is input from a video content provider. Supplemental data from the video content provider is input that is separate from the encoded bitstream and that specifies a first bitstream property. Further, in this embodiment, the encoded bitstream includes a syntax element specifying a second bitstream property that at least in part contradicts the first bitstream property. A performance characteristic of the decoder is set using the first bitstream property without using the second bitstream property, thereby overriding the contradictory syntax element from the encoded bitstream.

In another example embodiment, an encoded and encrypted bitstream of video media data from an external video content provider is input, the encoded bitstream being encoded according to a video codec standard and encrypted according to an encryption standard. Supplemental information is input that is separate from the encoded and encrypted bitstream and that identifies the encoded bitstream as being encrypted according to the encryption standard (e.g., the Common Encryption Scheme ("CENC")). A decoding process used to decode the encoded and encrypted bitstream is modified based at least in part on the supplemental information. By identifying that the bitstream is encoded according to a particular encryption standard, the supplemental information can be used to recognize restrictions or constraints in the bitstream that can be employed during the decoding process to improve decoder performance. In certain instances, the modifying reduces start code search time in the decoding process. In some instances, the modifying can override default behavior of the decoding process.

In a further example embodiment, a media file from an external video content provider is input, the media file being arranged according to a media file format standard (e.g., one of MPEG-4, MKV, CFF, and the like) and comprising an encoded bitstream encoded according to a video codec standard. Supplemental information is input that is separate from the media file and that provides an identity of the media file format standard by which the media file was assembled. A decoding process used to decode the encoded bitstream is modified based at least in part on the supplemental information. In certain instances, the modifying reduces start code search time in the decoding process. Further, the modifying can override the default behavior of the decoding process.

In yet another example embodiment, an encoded bitstream of video media data is input from an external video content provider, the encoded bitstream being encoded according to a video codec standard. A decoder is configured to decode the encoded bitstream based at least in part on supplemental information that identifies a property of the encoded bitstream but that is supplemental to the encoded bitstream. In some instances, the configuring the decoder overrides default behavior of the decoder. In certain instances, the supplemental information is inconsistent with one or more syntax elements in the bitstream, and the configuring the decoder comprises causing the decoder to ignore or modify the one or more syntax elements that are inconsistent with the supplemental information.

In a further example embodiment, an encoded bitstream of video media data is input from an external video content provider, the encoded bitstream being encoded according to a video codec standard. A decoder is configured to decode the encoded bitstream based at least in part on supplemental information that identifies a property of the encoded bitstream but that is supplemental to portions of the encoded bitstream required by the video codec standard. In some instances, the configuring the decoder overrides default behavior of the decoder. In certain instances, the supplemental information is inconsistent with one or more syntax elements in the bitstream, and the configuring the decoder comprises causing the decoder to ignore or modify the one or more syntax elements that are inconsistent with the supplemental information.

The foregoing and other objects, features, and advantages of the invention will become more apparent from the following detailed description, which proceeds with reference to the accompanying figures.

BRIEF DESCRIPTION OF THE DRAWINGS

FIG. 4 is a diagram of an example decoder system in conjunction with which some described embodiments can be implemented.

DETAILED DESCRIPTION

The detailed description presents innovations in improving decoder performance during the decoding of digital video media.

Although operations described herein are in places described as being performed by a video decoder, in many cases the operations can be performed by another type of media processing tool.

Some of the innovations described herein are illustrated with reference to syntax elements and operations specific to the H.264 and/or CENC standards. The innovations described herein can also be implemented for other standards or formats (e.g., the HEVC standard).

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems. Additionally, as used herein, the term "and/or" means any one item or combination of any items in the phrase. Further, as used herein, the term "optimiz*" (including variations such as optimization and optimizing) refers to a choice among options under a given scope of decision, and does not imply that an optimized choice is the "best" or "optimum" choice for an expanded scope of decisions.

I. EXAMPLE COMPUTING SYSTEMS

Figure 1:
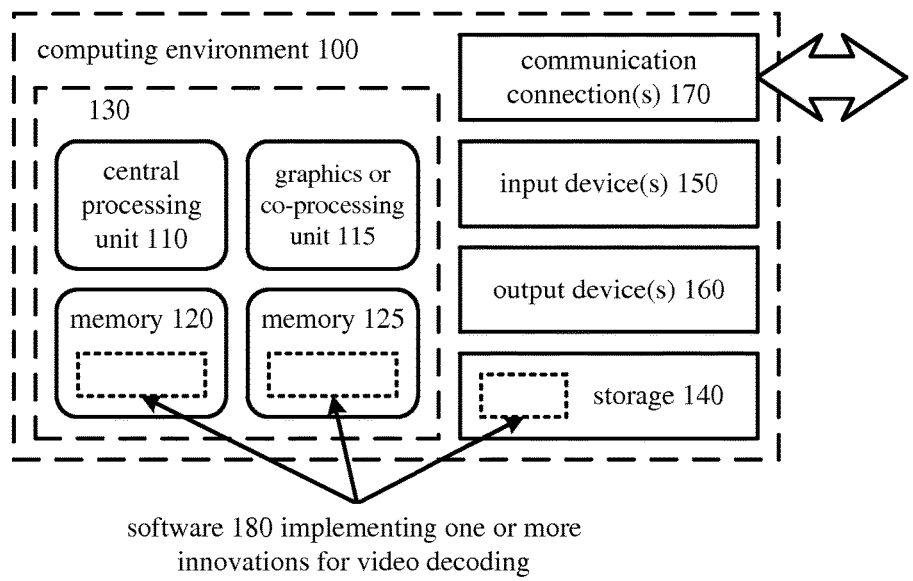
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems. The computing system (100) can be or be part of any of a variety of computing systems (e.g., a dedicated or general-purpose video decoder system, a desktop computer, laptop computer, tablet computer, game console, smart TV, cell phone, mobile device (such as a smartphone), video camera, or other such device).

With reference to FIG. 1, the computing system (100) includes one or more processing units (110, 115) and memory (120, 125). The processing units (110, 115) execute computer-executable instructions. A processing unit can be a general-purpose central processing unit ("CPU"), a processor in an application-specific integrated circuit ("ASIC") (such as a system on a chip ("SOC")), or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be one or more memory devices such as volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for performing video media decoding as disclosed herein, in the form of computer-executable instructions suitable for execution by the processing unit(s). The tangible memory (120, 125) does not include transitory signals or carrier waves per se.

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes one or more storage devices such as magnetic disks, solid state drives, magnetic tapes or cassettes, CD-ROMs, DVDs, or any other medium which can be used to store information and which can be accessed within the computing system (100). The storage (140) stores instructions for the software (180) implementing one or more innovations for performing video media decoding as disclosed herein. The tangible storage (140) does not include transitory signals or carrier waves per se.

The input device(s) (150) may be a touch input device such as a keyboard, mouse, pen, trackball, voice input device, scanning device, or another device that provides input to the computing system (100). For video, the input device(s) (150) may be a camera, video card, TV tuner card, screen capture module, or similar device that accepts video input in analog or digital form, or a CD-ROM, CD-RW, or DVD that reads video input into the computing system (100). The output device(s) (160) may be a display, printer, speaker, CD-writer, DVD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods. For instance, the disclosed methods can be incorporated into specialized hardware adapted to perform real-time video decoding for facilitating video conferencing, digital encoding of live events (e.g., live sporting events), or other such video application that demand fast, computationally efficient decoding.

For the sake of presentation, the detailed description uses terms like "determine" and "use" to describe operations in a computing system. These terms are high-level abstractions for operations performed by computing hardware, and should not be confused with acts performed by a human being. The actual computer operations corresponding to these terms vary depending on implementation.

II. EXAMPLE NETWORK ENVIRONMENTS

Figure 2A:
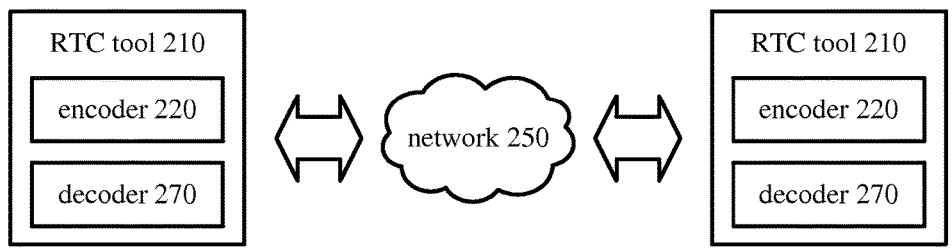
FIGS. 2a and 2b are diagrams of example network environments in which some described embodiments can be implemented.
Figure 2B:
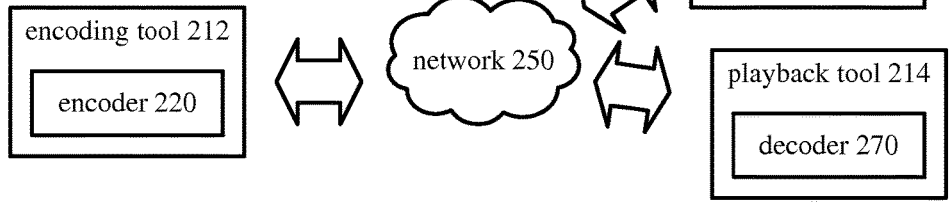

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the HEVC standard (also known as H.265), SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

Figure 3:
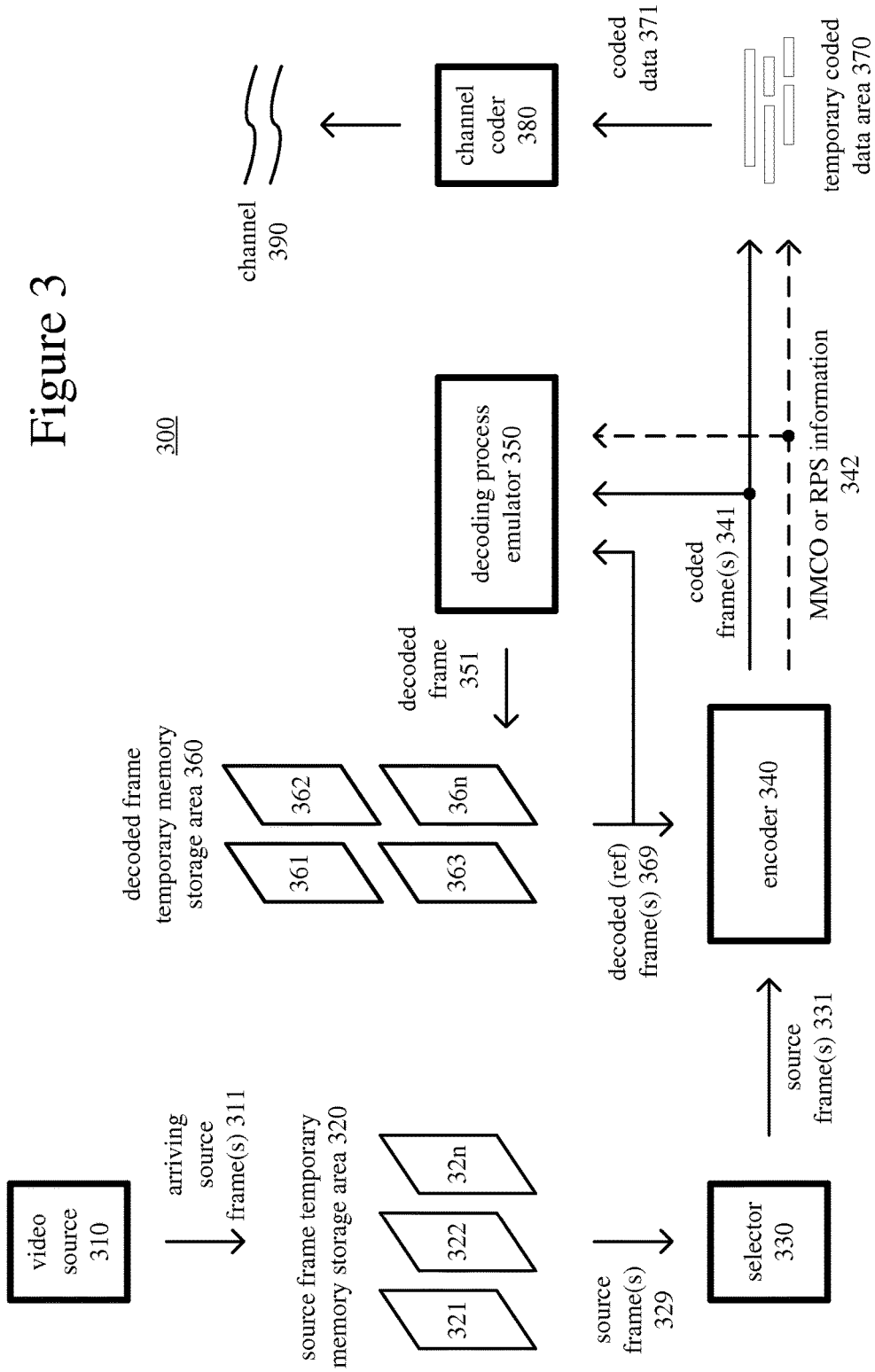
FIG. 3 is a diagram of an example encoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a digital video transmission (e.g., for transmission by a TV network), video surveillance system, web camera monitoring system, screen capture module, remote desktop conferencing presentation, or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. EXAMPLE ENCODER SYSTEMS

FIG. 3 is a block diagram of an example encoder system (300) in conjunction with which some described embodiments may be implemented. The encoder system (300) can be an encoding tool capable of operating in any of multiple encoding modes, such as a low-latency encoding mode for real-time communication, a transcoding mode, and/or a higher-latency encoding mode for producing media for playback from a file or stream, or it can be an encoding tool adapted for one such encoding mode. The encoder system (300) can be implemented as an operating system module, as part of an application library, and/or as a standalone application. Overall, the encoder system (300) receives a sequence of source video frames (311) from a video source (310) and produces encoded data as output to a channel (390).

The video source (310) can be a camera, tuner card, storage media, screen capture module, or other digital video source. The video source (310) produces a sequence of video frames at a frame rate of, for example, 30 frames per second. As used herein, the term "frame" generally refers to source, coded, or reconstructed image data. For progressive-scan (progressive-display-format) video, a frame is a progressive-scan video frame. For interlaced-scan (interlaced-display-format) video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) selects an individual source frame (329) from the source frame storage area (320). The order in which frames are selected by the frame selector (330) for input to the encoder (340) may differ from the order in which the frames are produced by the video source (310), e.g., the encoding of some frames may be delayed in order, so as to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Typically, before encoding, video has been converted to a color space such as YUV, in which sample values of a luma (Y) component represent brightness or intensity values, and sample values of chroma (U, V) components represent color-difference values. The chroma sample values may be sub-sampled to a lower chroma sampling rate (e.g., for YUV 4:2:0 format or YUV 4:2:2), or the chroma sample values may have the same resolution as the luma sample values (e.g., for YUV 4:4:4 format). In YUV 4:2:0 format, chroma components are downsampled by a factor of two horizontally and by a factor of two vertically. In YUV 4:2:2 format, chroma components are downsampled by a factor of two horizontally. Or, the video can be encoded in another format (e.g., RGB 4:4:4 format).

The encoder (340) encodes the selected frame (331) to produce a coded frame (341) and also produces memory management control operation ("MMCO") signals (342) or reference picture set ("RPS") information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructed frames may be used as reference frames, and hence should be stored in a frame storage area.

Generally, the encoder (340) includes multiple encoding modules that perform encoding tasks, such as partitioning into tiles, intra prediction estimation and prediction, motion estimation and compensation, frequency transforms, quantization, and/or entropy coding. The exact operations performed by the encoder (340) can vary depending on compression format. The format of the output encoded data can be a variation or extension of HEVC format (H.265), Windows Media Video format, VC-1 format, MPEG-x format (e.g., MPEG-1, MPEG-2, or MPEG-4), H.26x format (e.g., H.261, H.262, H.263, H.264, H.265), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to provide options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of samples for purposes of encoding and decoding.

For syntax according to the HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. As used herein, the term "block" can indicate a CB, PB, TB or other set of sample values, depending on context. The encoder decides how to partition video into CTUs, CUs, PUs, TUs, etc.

Returning to FIG. 3, the encoder represents an intra-coded block of a source frame (331) in terms of prediction from other, previously reconstructed sample values in the frame (331). For intra BC prediction, an intra-picture estimator estimates displacement of a block with respect to the other, previously reconstructed sample values. An intra-frame prediction reference region (or intra-prediction region, for short) is a region of samples in the frame that are used to generate BC-prediction values for the block. The intra-frame prediction region can be indicated with a block vector ("BV") value (determined in BV estimation). For intra spatial prediction for a block, the intra-picture estimator estimates extrapolation of the neighboring reconstructed sample values into the block. The intra-picture estimator can output prediction information (such as BV values for intra BC prediction or prediction mode (direction) for intra spatial prediction), which is entropy coded. An intra-frame prediction predictor applies the prediction information to determine intra prediction values.

The encoder (340) represents an inter-frame coded, predicted block of a source frame (331) in terms of prediction from reference frames. A motion estimator estimates the motion of the block with respect to one or more reference frames (369). When multiple reference frames are used, the multiple reference frames can be from different temporal directions or the same temporal direction.

A motion-compensated prediction reference region is a region of samples in the reference frame(s) that is used to generate motion-compensated prediction values for a block of samples of a current frame. The motion estimator outputs motion information such as MV information, which is entropy coded.

The encoder can determine the differences (if any) between a block's prediction values (intra or inter) and corresponding original values. These prediction residual values are further encoded using a frequency transform, quantization and entropy encoding. For example, the encoder (340) sets values for a quantization parameter ("QP") for a picture, tile, slice, and/or other portion of video, and quantizes transform coefficients accordingly. The entropy coder of the encoder (340) compresses quantized transform coefficient values as well as certain side information (e.g., MV information, BV values, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and/or combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

An adaptive deblocking filter is included within the motion compensation loop in the encoder (340) to smooth discontinuities across block boundary rows and/or columns in a decoded frame. Other filtering (such as de-ringing filtering, adaptive loop filtering ("ALF"), or sample-adaptive offset ("SAO") filtering; not shown) can alternatively or additionally be applied as in-loop filtering operations.

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames. In a manner consistent with the MMCO/RPS information (342), the decoding process emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550 (also known as the real-time transport protocol (RTP)), in which case the channel encoder (380) can add syntax elements as part of the syntax of the media transmission stream. The syntax elements can include flags or bits defined by the codec standard and that specify a bitstream property or attribute. Or, the channel encoder (380) can organize the aggregated data for storage as a file (e.g., according to a media container format such as ISO/IEC 14496-12, MP4, etc.), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). As used herein, the terms "media file" and "media container" are to be understood to include results of applying any media system multiplexing or transport protocol and encompass results from applying media streaming formats/protocols as well as media storage formats/protocols as noted above. The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. EXAMPLE DECODER SYSTEMS

FIG. 4 is a block diagram of an example decoder system (400) in conjunction with which some described embodiments can be implemented. The decoder system (400) can be a decoding tool capable of operating in any of multiple decoding mode, such as a low-latency decoding mode for real-time communication and a higher-latency decoding mode for media playback from a file or stream, or it can be a decoding tool adapted for one such decoding mode. The decoder system (400) can be implemented as an operating system module, as part of an application library, and/or as a standalone application. In certain embodiments described herein, the decoder is an operating system decoder made available for use by the underlying operating system operating of the computing device. Overall, the decoder system (400) receives coded data from a channel (410) and produces reconstructed frames as output for an output destination (490).

The decoder system (400) includes a channel (410), which can represent storage, a communications connection (e.g., the internet), or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0|ISO/IEC 13818-1 or an internet real-time transport protocol format such as IETF RFC 3550 (also known as the real-time transport protocol (RTP))), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12, MP4, etc.), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks, such as entropy decoding, intra-frame prediction, motion-compensated inter-frame prediction, inverse quantization, inverse frequency transforms, and/or merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An intra-frame prediction module can spatially predict sample values of a current block from neighboring, previously reconstructed sample values or, for intra BC prediction, predict sample values of a current block using previously reconstructed sample values of an intra-frame prediction region in the frame. The intra-frame prediction region can be indicated with a BV value. The decoder (450) also reconstructs prediction residual values. An inverse quantizer inverse quantizes entropy-decoded data. For example, the decoder (450) sets values for the QP for a picture, tile, slice and/or other portion of video based on syntax elements in the bitstream, and inverse quantizes transform coefficients accordingly. An inverse frequency transformer converts the quantized, frequency-domain data into spatial-domain data. For an inter-frame predicted block, the decoder (450) combines reconstructed prediction residual values with motion-compensated prediction values. The decoder (450) can similarly combine prediction residual values with prediction values from intra-frame prediction. An adaptive deblocking filter is included within the motion compensation loop in the video decoder (450) to smooth discontinuities across block boundary rows and/or columns in the decoded frame (451). Other filtering (such as de-ringing filtering, ALF, or SAO filtering; not shown) can alternatively or additionally be applied as in-loop filtering operations.

The decoded frame temporary memory storage area (460) includes multiple frame buffer storage areas (461, 462, . . . , 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) identifies when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. EXAMPLE VIDEO ENCODERS

Figure 5A:
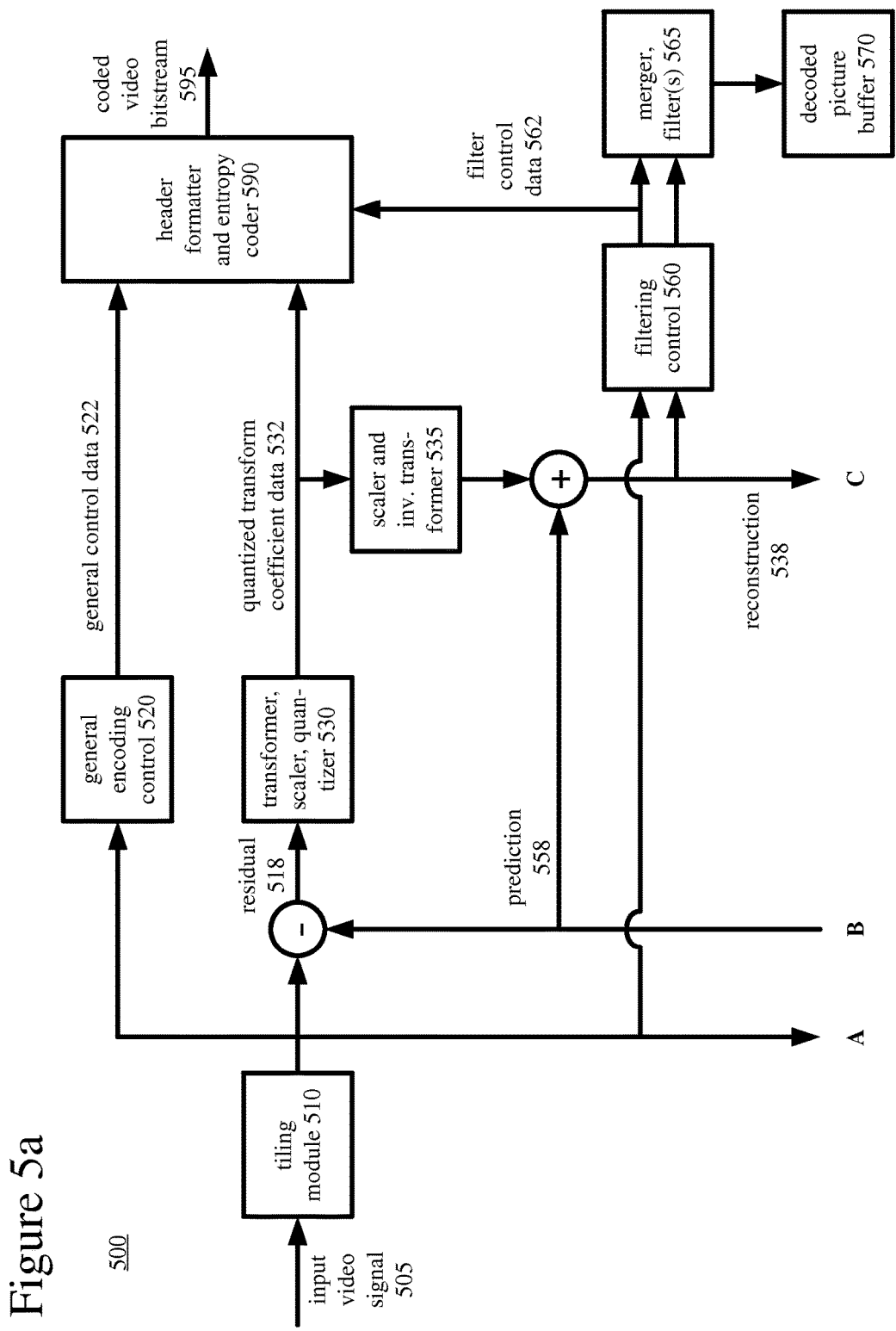
FIGS. 5a and 5b are diagrams illustrating an example video encoder in conjunction with which some described embodiments can be implemented.
Figure 5B:
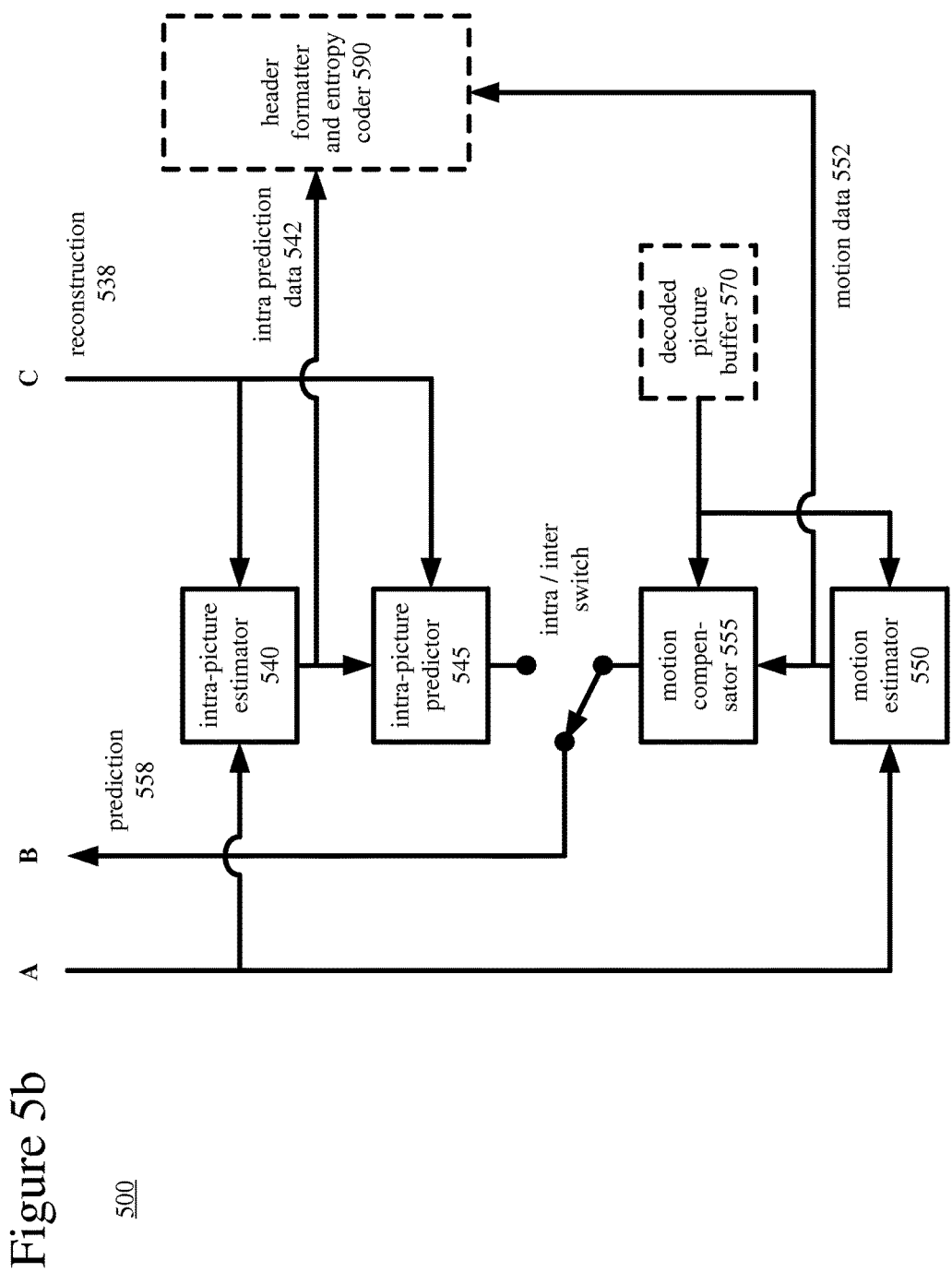

FIGS. 5a and 5b are a block diagram of a generalized video encoder (500) in conjunction with which some of the described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550), and/or intra/inter switch) to set and change coding parameters during encoding. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates the motion of blocks of sample values of the current picture of the input video signal (505) with respect to one or more reference pictures.

The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as MV data, merge mode index values, and/or reference picture selection data. The side information including motion data (552) is provided to the header formatter/entropy coder (590) as well as the motion compensator (555).

The motion compensator (555) applies MV values to the reconstructed reference picture(s) from the decoded picture buffer (570). When the chroma data for a picture has the same resolution as the luma data (e.g. when the format is YUV 4:4:4 format or RGB 4:4:4 format), the MV value that is applied for a chroma block may be the same as the MV value applied for the luma block. On the other hand, when the chroma data for a picture has reduced resolution relative to the luma data (e.g. when the format is YUV 4:2:0 format or YUV 4:2:2 format), the MV value that is applied for a chroma block may be scaled down and possibly rounded to adjust for the difference in chroma resolution (e.g., for YUV 4:2:0 format, by dividing the vertical and horizontal components of the MV value by two and truncating or rounding them to integer values; for YUV 4:2:2 format, by dividing the horizontal component of the MV value by two and truncating or rounding it to an integer value). The motion compensator (555) produces motion-compensated predictions for the current picture.

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540)

determines how to spatially predict sample values of a current block of the current picture from neighboring, previously reconstructed sample values of the current picture. Or, for intra BC prediction using BV values, the intra-picture estimator (540) estimates displacement of the sample values of the current block to different candidate regions within the current picture.

The intra-picture estimator (540) produces as side information intra prediction data (542), such as information indicating whether intra prediction uses spatial prediction or intra BC prediction (e.g., a flag value per intra block), prediction mode direction (for intra spatial prediction), and/or BV values (for intra BC prediction). The intra prediction data (542) is provided to the header formatter/entropy coder (590) as well as the intra-picture predictor (545).

According to the intra prediction data (542), the intra-picture predictor (545) spatially predicts sample values of a current block of the current picture from neighboring, previously reconstructed sample values of the current picture. Or, for intra BC prediction, the intra-picture predictor (545) predicts the sample values of the current block using previously reconstructed sample values of an intra-prediction region, which is indicated by a BV value for the current block.

The intra/inter switch selects values of a motion-compensated prediction or intra-picture prediction for use as the prediction (558) for a given block. The difference (if any) between a block of the prediction (558) and a corresponding part of the original current picture of the input video signal (505) provides values of the residual (518). During reconstruction of the current picture, reconstructed residual values are combined with the prediction (558) to produce a reconstruction (538) of the original content from the video signal (505). In lossy compression, however, some information is still lost from the video signal (505).

In the transformer/scaler/quantizer (530), a frequency transformer converts spatial-domain video data into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (558) is null), producing blocks of frequency transform coefficients. The encoder (500) may also be able to indicate that such transform step is skipped. The scaler/quantizer scales and quantizes the transform coefficients. For example, the quantizer applies dead-zone scalar quantization to the frequency-domain data with a quantization step size that varies on a frame-by-frame basis, tile-by-tile basis, slice-by-slice basis, block-by-block basis, frequency-specific basis, or other basis. The quantized transform coefficient data (532) is provided to the header formatter/entropy coder (590).

In the scaler/inverse transformer (535), a scaler/inverse quantizer performs inverse scaling and inverse quantization on the quantized transform coefficients. An inverse frequency transformer performs an inverse frequency transform, producing blocks of reconstructed prediction residual values or sample values. The encoder (500) combines reconstructed residual values with values of the prediction (558) (e.g., motion-compensated prediction values, intra-picture prediction values) to form the reconstruction (538).

For intra-picture prediction, the values of the reconstruction (538) can be fed back to the intra-picture estimator (540) and intra-picture predictor (545). Also, the values of the reconstruction (538) can be used for motion-compensated prediction of subsequent pictures. The values of the reconstruction (538) can be further filtered. A filtering control (560) determines how to perform deblock filtering and SAO filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the frames. Other filtering (such as de-ringing filtering or ALF; not shown) can alternatively or additionally be applied. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552), and/or filter control data (562). MV values can be predictively coded. For example, the header formatter/entropy coder (590) uses Exponential-Golomb coding for entropy coding of various syntax elements such as syntax elements for differential MV values, after MV prediction.

The header formatter/entropy coder (590) provides the encoded data in the coded video bitstream (595). The format of the coded video bitstream (595) can be a variation or extension of HEVC format (H.265), Windows Media Video format, VC-1 format, MPEG-x format (e.g., MPEG-1, MPEG-2, or MPEG-4), H.26x format (e.g., H.261, H.262, H.263, H.264, H.265), or another format.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. EXAMPLE VIDEO DECODERS

Figure 6:
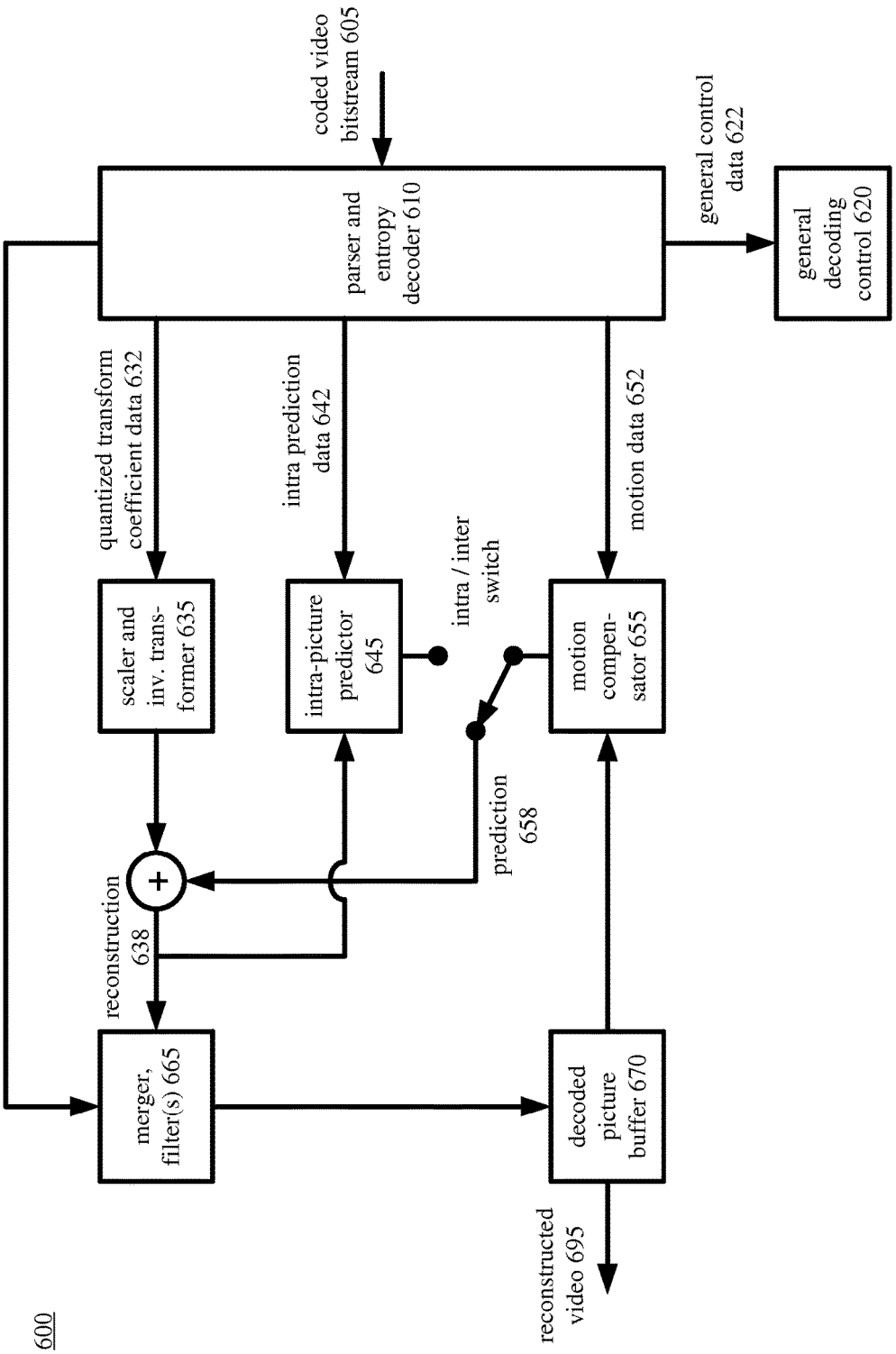
FIG. 6 is a diagram illustrating an example video decoder in conjunction with which some described embodiments can be implemented.

FIG. 6 is a block diagram of a generalized decoder (600) in conjunction with which some described embodiments can be implemented. The decoder (600) receives encoded data in a coded video bitstream (605) and produces output including pictures for reconstructed video (695). The format of the coded video bitstream (605) can be a variation or extension of HEVC format (H.265), Windows Media Video format, VC-1 format, MPEG-x format (e.g., MPEG-1, MPEG-2, or MPEG-4), H.26x format (e.g., H.261, H.262, H.263, H.264, H.265), or another format.

The decoder (600) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the HEVC standard, a picture is partitioned into CTUs (CTBs), CUs (CBs), PUs (PBs) and TU (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652), and/or filter control data (662). In particular, for the motion data (652), the parser/entropy decoder (610) can entropy decode syntax elements for differential MV values, e.g., using context-adaptive binary arithmetic decoding, then combine the differential MV values with predicted MV values.

The general decoding control (620) receives the general control data (622) and provides control signals (not shown) to other modules (such as the scaler/inverse transformer (635), intra-picture predictor (645), motion compensator (655), and/or intra/inter switch) to set and change decoding parameters during decoding.

If the current picture is predicted using inter-picture prediction, a motion compensator (655) receives the motion data (652), such as MV data, reference picture selection data and merge mode index values. The motion compensator (655) applies MVs to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures.

In a separate path within the decoder (600), the intra-frame prediction predictor (645) receives the intra prediction data (642), such as information indicating whether intra prediction uses spatial prediction or intra BC prediction (e.g., a flag value per intra block), prediction mode direction (for intra spatial prediction) and BV values (for intra BC prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture. Or, for intra BC prediction using BV values, the intra-picture predictor (645) predicts the sample values of the current block using previously reconstructed sample values of an intra-prediction region, which is indicated by a BV value for the current block.

The intra/inter switch selects values of a motion-compensated prediction or intra-picture prediction for use as the prediction (658) for a given block. For example, when HEVC syntax is followed, the intra/inter switch can be controlled based on a syntax element encoded for a CU of a picture that can contain intra-predicted CUs and inter-predicted CUs. The decoder (600) combines the prediction (658) with reconstructed residual values to produce the reconstruction (638) of the content from the video signal.

To reconstruct the residual, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof).

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the frames. Other filtering (such as de-ringing filtering or ALF; not shown) can alternatively or additionally be applied. Tile boundaries can be selectively filtered or not filtered at all, depending on settings of the decoder (600) or a syntax indication within the encoded bitstream data. The decoded picture buffer (670) buffers the reconstructed current picture for use in subsequent motion-compensated prediction.

The decoder (600) can also include a post-processing filter. The post-processing filter can include de-ringing filtering, adaptive Wiener filtering, film-grain reproduction filtering, SAO filtering or another kind of filtering.

Depending on the implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. EXAMPLE TECHNIQUES FOR IMPROVING DECODER PERFORMANCE AND RESOURCE USAGE

This section presents various approaches to performing and controlling decoding operations during the decoding of compressed video media data. Certain embodiments of the disclosed technology use knowledge of a particular application or standard with which encoded video media is received to guide and optimize decoder performance (e.g., in terms of memory, power consumption, speed, and/or latency). For instance, embodiments of the disclosed technology use application, scenario, and/or content properties to guide and optimize decoder performance. These approaches facilitate decoding operations with improved computational efficiency, faster speeds, reduced power, reduced latency, and/or reduced memory usage and demand.

The approaches described herein can be applied when decoding any type of video. In particular examples, however, the disclosed techniques can improve decoder performance in situations where a decoder is provided by an operating system (e.g., Windows, IOS, Android, etc.) and is requested and instantiated by a video streaming service through an application (e.g., a mobile device application), web page, plug-in, or other such mechanism. For instance, through an application, web page, or plug-in executing on a computing device (e.g., a mobile device, game console, tablet computer, laptop computer, desktop computer, smart TV, or other such device), a video streaming service (e.g., a third-party service delivering video content, such as movies, TV shows, sporting events, or other such video content) can request an instantiation of a video decoder from the operating system of the computing device (e.g., an H.264, HEVC (H.265), or other decoder implementation supported by the operating system) and then deliver encoded video content to the video decoder for decoding and rendering at a display device of the computing device. The application, web page, or plug-in is typically written by the third-party video streaming service and customized to handle its video content. The communication between the operating system and the application, web page, or plug-in can be implemented through an application program interface ("API") that is provided by the operating system vendor and made available to third parties for application development. For example, in certain non-limiting implementations, communications are provided through one or more APIs of the Microsoft Media Foundation platform.

There are many instances when a decoder that is instantiated for a particular scenario or application: (1) dedicates resources that are unnecessary (e.g., memory that is never used, such as GPU and/or CPU system memory); (2) underutilizes or fails to use faster decoding resource (e.g., hardware decoding resources, such as DirectX video accelerated ("DXVA") decoding or other hardware-assisted video decoding); and/or or (3) includes needless but time-consuming operations (e.g., needless searches for start codes). Several example situations are introduced below. These examples are not to be construed as limiting but are illustrative of the problems that embodiments of the disclosed technology address.

In one example situation, due to various reasons, the input bitstream to a video decoder has one or more syntax elements (e.g., flags or bits defining bitstream attributes or properties) that do not reflect the actual properties of the bitstream. Such an "imperfect" bitstream might be standard compliant for a given standard (e.g., H.264, HEVC (H.265), etc.) and allow for proper decoding but create decoder behavior that is unnecessary, slow, and/or resource intensive.

As a first example, and using an H.264 video bitstream for illustrative purposes, the H.264 bitstream can be marked by a decoder as a baseline profile bitstream but not a constrained baseline profile bitstream, even though the actual contents of the bitstream are for the constrained baseline profile. This situation can arise because the bitstream does not include a flag specifying that it is a constrained baseline profile bitstream (clear profile definitions in the H.264 standard were not defined in early versions of the standard and the baseline profile is the default profile for the decoder). Or, the situation may arise because an encoder set an (incorrect or imperfect) flag in the bitstream indicating that the bitstream is a baseline profile bitstream. These cases have been observed for certain video content services. In such cases, the decoder uses unnecessary and/or inefficient resources. For example, in some systems, constrained baseline profile bitstreams can be decoded at least in part using dedicated hardware customized for decoding such bitstreams, thus enabling fast and efficient decoding. But the use of such desirable hardware resources is prevented because of the "imperfect" bitstream. For instance, one example decoder uses DirectX video accelerated ("DXVA") decoding for constrained baseline profile bitstreams and software decoding for baseline profile bitstreams. For an imperfect bitstream as described, such a decoder would use software decoding, which suffers from degraded performance and increased power consumption relative to the hardware-accelerated decoding.

As a second example, some bitstream syntaxes indicate there might be some pictures in a sequence that are to be displayed in interlaced format, even though the video contents are actually always in a progressive display format. For instance, a pic_struct_present_flag may be equal to 1, but pic_struct is always 0. Such cases have been observed for certain video content services. In such cases, the decoder will reserve extra memory to prepare for the potential interlaced-display-format contents, even though the contents will never show up.

As a third example, and for certain applications, video content is encoded and streamed in a low-latency format, but there is no indication in the bitstream of such low-latency encoding. For instance, in one particular low-latency streaming scenario (e.g., Miracast), the display and output order of video frames is the same as the input and decoding order, but no syntax elements in the elementary bitstream indicate that such a restriction exists. In some cases, this situation exists even though the video codec standard by which the bitstream was encoded allows encoder to specify these via bitstream syntax. Such an imperfection has been observed, for example, in bitstreams generated by some Miracast devices. In such cases, the decoder will have to reserve extra memory to prepare for the reference frames that are expected to be used during the decoding process (e.g., as part of a motion compensation process that uses one or more references frames). Further, during decoding, the decoder will end up decoding several pictures before it can output the picture for display, thereby introducing substantial delay/latency and high memory usage in the Miracast receiver. Thus, although the video media data is encoded in a format that creates an opportunity for reduced resource usage by the decoder, the "imperfect" bitstream does not include any standardized syntax element to indicate such low-latency encoding.

The examples above can be considered scenario- or application-specific, as they involve particular usage cases where opportunities for improved decoder performance are missed. As illustrated, such usage cases arise due to misleading (or imperfect) information in the bitstream and/or due to a lack information provided in the bitstream.

In a further example situation, the video content for a certain application or scenario has special properties that could be used for decoder optimizations but instead are typically overlooked and ignored by decoder.

As a first example, video media data can be jointly encoded according to both an encoding standard (e.g., H.264, HEVC, etc.) as well as an encryption standard (e.g., CENC or other such standard for use digital rights management ("DRM")). When decoding such a jointly encoded bitstream, a decoder typically will not differentiate such a bitstream from any other bitstream and perform a search for start codes in all portions of the bitstream received, including encrypted portions of the bitstream. Such searching is computationally intensive and time consuming.

As a second example, some encoded video media data specifies information within its bitstream that is ignored during decoder startup but that could improve decoder performance. For instance, NALU length information that indicates the boundaries of each NALU and picture boundary information is available in certain file formats (e.g., MP4, MKV, CFF, RTP, and certain private channels). Nonetheless, a decoder will typically not use such information while searching for start codes. Instead, decoders will perform an extra start code search for each NALU unit. Such searching is computationally intensive and time consuming.

Embodiments of the disclosed technology enhance decoder performance in such scenarios (e.g., in terms of memory, power consumption, speed, and/or latency). FIGS. 7-10 are schematic block diagrams illustrating example systems and approaches for enhancing decoder performance in such situations.

Figure 7:
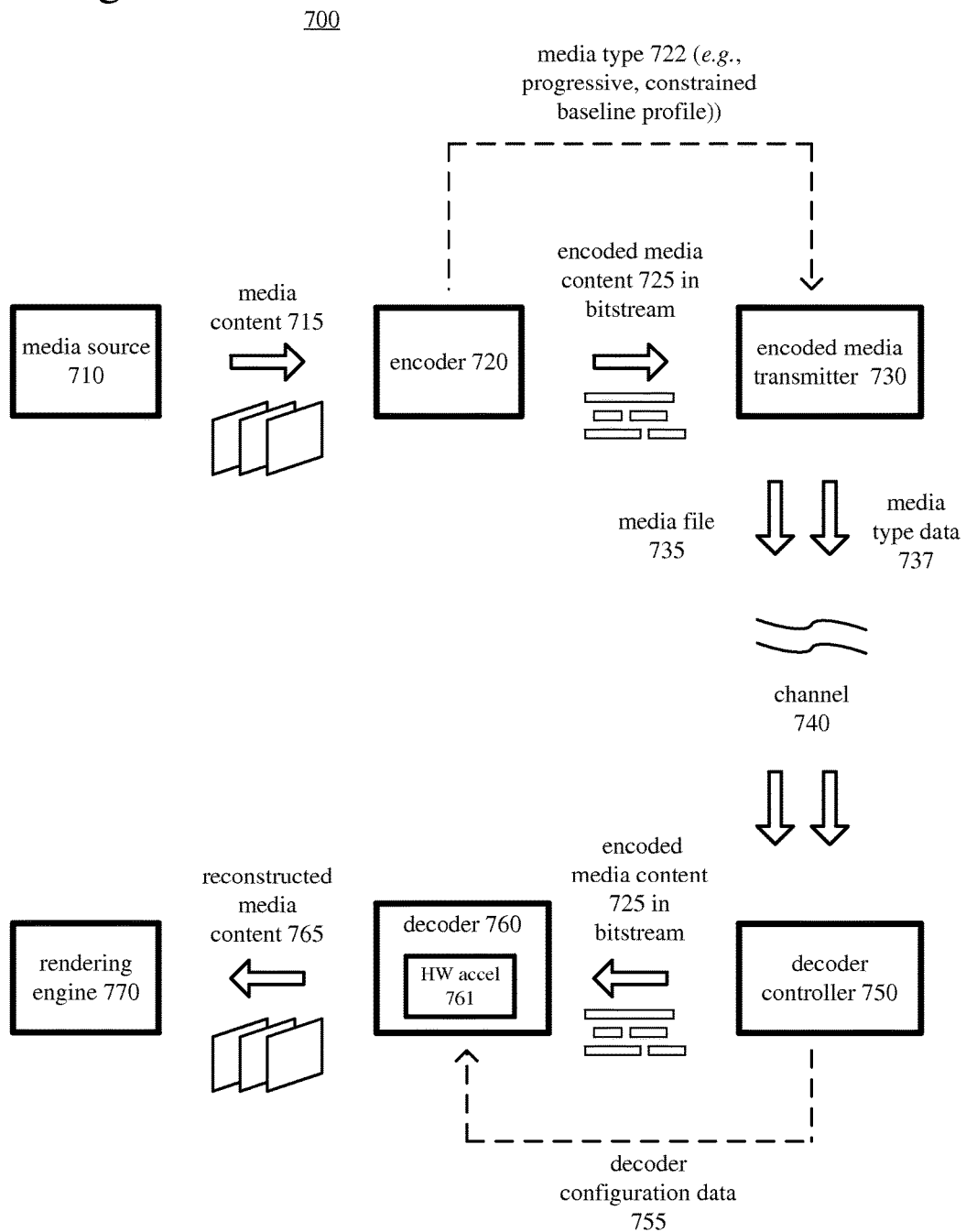
FIGS. 7-10 are diagrams illustrating example systems implementing embodiments of the disclosed technology.

FIG. 7 is a block diagram of an example system (700) in conjunction with which some described embodiments may be implemented. At the encoder side, the system (700) includes a media source (710), encoder (720) and encoded media transmitter (730). At the decoder side, the system (700) includes a decoder controller (750), decoder (760) and rendering engine (770).

The media source (710) provides media content (715). For video, the media source (710) can be a camera, tuner card, storage media (e.g., storing previously generated and stored media content), screen capture module, animation output or other digital video source. A video source typically produces a sequence of video frames. For progressive-display-format video, a frame is a progressive video frame.

Before the encoder (720), the system (700) can include a buffer for storing media content (715) as well as a pre-processor that performs pre-processing (e.g., filtering) of the media content (715) before encoding. The pre-processing can also include color space conversion, color range scaling, and/or other processing.

The encoder (720) receives media content (715) provided by the media source (710) and produces encoded media content (725) in an elementary media bitstream (also referred to as encoded bitstream (725)) as output to the encoded media transmitter (730). The encoder (720) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. Further, the encoded media content (725) can be stored on storage media for later access and transmission by the encoded media transmitter (730) (e.g., as part of a video streaming service). The encoder (720) can be implemented as an operating system module, as part of an application library, as a part of a standalone application, or using special-purpose hardware. Further, the encoder-side components (710), (720), (730) may all be part of a third-party service or provider separate from the decoder-side components (750), (760), (770). For instance, the encoder-side components may be part of a video streaming service that provides on-demand video streaming to a computing device (e.g., a mobile device) via a dedicated application, web page, or plug-in of a computing device having an operating system that provides and supports the decoder-side components (710), (720), (730).

Generally, the encoder (720) includes multiple encoding modules that perform encoding tasks such as prediction, frequency transforms, quantization and entropy coding. The exact operations performed by the encoder (720) can vary depending on codec format. For video, the format of the output encoded video content can be a Windows Media Video format, VC-1 format, MPEG-x format (e.g., MPEG-1, MPEG-2, or MPEG-4), H.26x format (e.g., H.261, H.262, H.263, H.264), HEVC format (H.265), VPx format, or other format. In example implementations, the encoder (720) is a H.264 encoder for the baseline profile or constrained baseline profile and/or for encoding video in a progressive display or interlaced display format.

The encoded media content (725) in the elementary media bitstream can be aggregated and buffered in a temporary coded data area. The encoded media content (725) that is aggregated can include, as part of the syntax of the elementary media bitstream, one or more syntax elements that specify a bitstream property that does not completely or accurately reflect the encoding process it performed. For example, as noted above, the bitstream may include an inaccurate indication of whether the bitstream was encoded according to a constrained baseline profile or whether the bitstream was encoded using a progressive display format. This inaccurate indication may also be the result of the encoder (720) omitting a relevant syntax element altogether. Nevertheless, information about the actual encoding process performed may be known and can be passed to the encoded media transmitter (730) outside of the bitstream. For instance, such information is illustrated schematically in FIG. 7 as media type data (722) and can include, for instance, actual information about a bitstream property (e.g., whether a bitstream actually contains progressive-display-format or interlaced-display-format video, or whether a bitstream actually was encoded according to a baseline profile or a constrained baseline profile).

The encoded media transmitter (730) receives the encoded media content (725) in the elementary bitstream, organizes the encoded media content (725) in a media file (735) (also referred to as a media container) according to a media file format (also referred to as a file format or container format) (e.g., ISO/IEC 14496-12, ASF, WebM, MKV, CFF, MPEG-4, MPEG-2 transport stream, ITU-T H.222.0|ISO/IEC 13818-1, IETF RFC 3550 (RTP), or another media streaming or storage file format), packetizes the media file (735) for transmission as a media stream as appropriate, and transmits the media file (735) over channel (740) to a decoder controller (750). In some embodiments, encryption is also applied to the elementary bitstream or the media file for digital rights management (DRM) purposes. The channel (740) represents a communications connection (e.g., over the Internet), storage, or another channel for the output.

The decoder controller (750) represents the controller or other logic for receiving information about the encoded media to be decoded and instantiating and configuring a decoder to decode the encoded media. The decoder controller (750) can be part of the decoder itself, part of the operating system that provides and supports the decoder, or some combination thereof. In the illustrated embodiment, the decoder controller (750) controls the resources dedicated for use by the decoder and controls other performance characteristics of the decoder (e.g., whether dedicated decoding hardware (instead of decoding software) is used during decoding, how start code searches are performed, and the like).

In the illustrated embodiment, the encoded media transmitter (730) further transmits media type data (737) to a decoder controller (750). For example, in particular embodiments, the video media provider operating the encoded media transmitter (730) can communicate with the decoder controller (750) via an application program interface ("API") for the decoder components (e.g., a Microsoft Media Foundation API). Again, the decoder can be a decoder supported by an operating system that is called by an application, web page, or plug-in for use in decoding encoded video. The API for the decoder can allow for certain types of information separate from the encoded bitstream to be specified and made available to the decoder controller (750). In the illustrated embodiment, the media type data (737) is provided to the decoder controller (750) via the API, is separate from the encoded bitstream (and, in the illustrated embodiment, separate from the media container (media file)), and specifies information that can be used to improve one or more performance characteristics of the decoder (e.g., memory usage, speed, usage of hardware-accelerated decoding components, etc.). The media type data (737) can include a variety of metadata useful to the decoder. For example, the media type data (737) can include an indication that the media is actually encoded as progressive-display-format video or that the video was encoded according to the constrained baseline profile. This media type data (737) can be used to control the decoder and to override contradictory information specified in the bitstream. In some cases, when the media type data (737) is used to control the decoder and override contradictory information, the decoder actually operates in a fashion that is not compliant with the standard, as it ignores certain specified information in the encoded bitstream (e.g., information specified in one or more syntax elements of the encoded bitstream).

Further, the information used to control the decoder can be inferred or determined from other types of information that are sent via the API and that are separate from the encoded bitstream. For instance, if data sent from the encoded media transmitter (730) provides an identity of the transmitter (e.g., one or more of an IP address, device manufacturer information, device identity information, etc.), and that identity is known to transmit progressive-display-format video only and/or constrained baseline profile only bitstreams, then this information can obtained through inference. A database storing data qualified to be used in making this determination (e.g., a cross-reference database) can be stored among the decoder-side components and accessed by the decoder controller (750).

The decoder controller (750) receives and processes the media file (735) to extract (remove) the encoded bitstream (725) from its media container. For instance, the decoder controller (750) can de-packetize, demultiplex, and/or parse the encoded bitstream from media file content that has been assembled for transmission as a media stream. For example, the decoder controller (750) can buffer media file content as it is received (e.g., in a memory buffer or cache), perform the appropriate processing operations to extract the encoded bitstream from its media container, and prepare and output the encoded bitstream for continuous decoding by the decoder (760).

The decoder controller (750) further includes logic for processing the media type data (737) and optimizing the decoder. For example, the decoder controller (750) can use information from the media type data (737) to control one or more performance characteristics of the decoder.

As an example, when the media type data (737) includes an indication that the encoded bitstream was encoded according to a constrained baseline profile, the decoder controller (750) can configure the decoder (760) (via decoder configuration data (755)) to use specialized hardware (761) (such as a hardware accelerator) for decoding the bitstream as opposed to software, greatly increasing decoder efficiency and reducing processor and memory usage. In doing so, the decoder controller (750) can ignore or override a contrary or inconsistent signal in the bitstream itself. In practice, overriding the contrary or inconsistent signal in the bitstream can be performed by causing the decoder to ignore the signal or by actually modifying the bitstream to include a different signal (e.g., altering the syntax element for specifying the encoding profile type such that it reflects the media type data, or adding such a syntax element when one does not currently exist).

As another example, when the media type data (737) includes an indication that the encoded bitstream was encoded as progressive-display-format video, the decoder controller (750) can configure the decoder (760) (via decoder configuration data (755)) to reduce its dedicated memory usage and to perform decoding for progressive video frames only, thereby improving decoder performance and reducing resource usage. In doing so, the decoder controller (750) can ignore or override a contrary or inconsistent signal in the bitstream itself. Again, in practice, overriding the contrary or inconsistent signal in the bitstream can be performed by causing the decoder to ignore the signal or by actually modifying the bitstream to include a different signal (e.g., altering the syntax element for specifying the encoding profile type such that it reflects the media type data, or adding such a syntax element when one does not currently exist).

The encoded bitstream (725) that is output from the decoder controller (750) is stored in a temporary coded data area until a sufficient quantity of such data has been received. The decoder (760) receives the encoded bitstream (725) provided by the decoder controller (750) and produces reconstructed media content (765). The decoder (760) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder (760) can be implemented as an operating system module, as part of an application library, as part of a standalone application, or using special-purpose hardware.

Generally, the decoder (760) includes multiple decoding modules that perform decoding tasks such as entropy decoding, inverse quantization, inverse frequency transforms and prediction. The exact operations performed by the decoder (760) can vary depending on codec format. For video, the format of the encoded video content can be a Windows Media Video format, VC-1 format, MPEG-x format (e.g., MPEG-1, MPEG-2, or MPEG-4), H.26x format (e.g., H.261, H.262, H.263, H.264), HEVC format (H.265), VPx format or other format. In example implementations, the decoder (760) is an H.264 decoder.

A decoded frame temporary memory storage area can include multiple frame buffer storage areas for reconstructed media content (765). The rendering engine (770) processes the reconstructed media content (765) for output. In example implementations, the rendering engine (770) includes, for instance, a color converter and display module.

In the illustrated embodiment, the media type data (737) is separate from the encoded bitstream as well as the media file (media container). In other embodiments, however, the data used to guide the decoder is contained in the bitstream, but is not data that is required by the video codec by which the bitstream was encoded. For instance, in some embodiments, the data used to guide the decoder in a manner as described above is included in supplemental enhancement information ("SEI") of the encoded bitstream.

Figure 8:
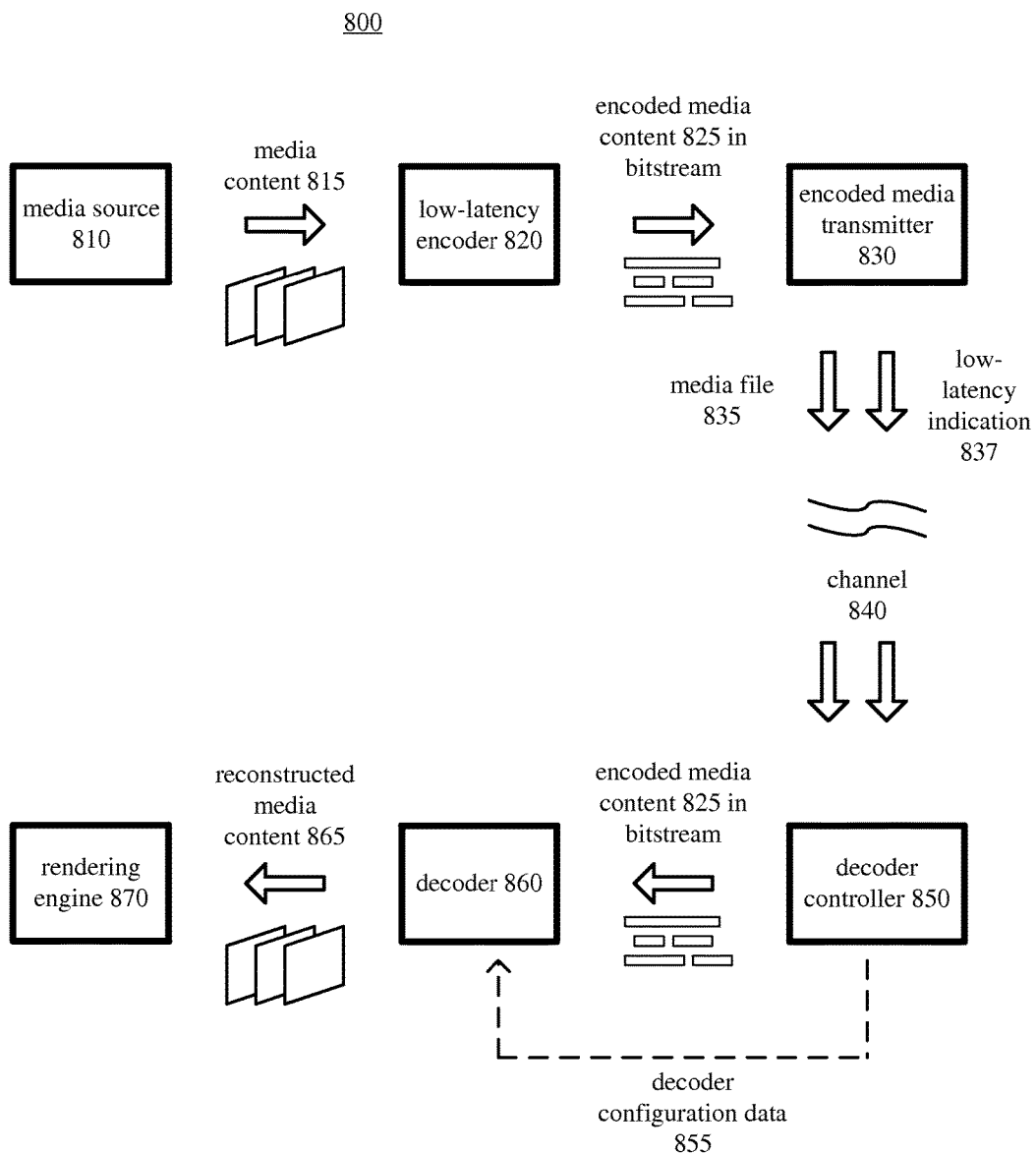

FIG. 8 is a block diagram of an example system (800) illustrating another example scenario in which application-guided video decoding enhancements are performed. Unless otherwise stated, the function and options of the components of system (700) in FIG. 7 apply to the system (800) in FIG. 8 as well, and therefore are sometimes not repeated in this discussion. At the encoder side, the system (800) includes a media source (810), encoder (820) and encoded media transmitter (830). At the decoder side, the system (800) includes a decoder controller (850), decoder (860) and rendering engine (870).

The media source (810) provides media content (815). Before the encoder (820), the system (800) can include a buffer for storing media content (815) as well as a pre-processor that performs pre-processing (e.g., filtering) of the media content (815) before encoding. The pre-processing can also include color space conversion, color range scaling, and/or other processing.

The encoder (820) receives media content (815) provided by the media source (810) and produces encoded media content (825) in an elementary media bitstream (also referred to as encoded bitstream (825)) as output to the encoded media transmitter (830). In general, system (800) illustrates a scenario in which video is encoded by a low-latency encoder (820) according to a low-latency setting or standard. For example, the encoder-side components can be part of a Miracast device, which uses a low-latency encoding scheme in which frames are not reordered and are encoded on a so-called "1-in 1-out" basis (e.g., no reference frames are used during encoding or decoding). The low-latency encoding performed by low-latency encoder (820) may be one of several available encoding options at the encoder, or may be the only encoding mode offered by the encoder. Further, the encoded media content (825) can be stored on storage media for later access and transmission by the encoded media transmitter (830) or be buffered and transmitted as soon as it available (e.g., as part of a device-to-device Miracast stream). The encoder (820) can be implemented as an operating system module, as part of an application library, as a part of a standalone application or using special-purpose hardware. Further, the encoder-side components (810), (820), (830) may all be part of a third-party device, service, or provider separate from the decoder-side components (850), (860), (870). For instance, the encoder-side components may be part of a device (e.g. a Miracast-enabled device) that provides low-latency streaming to another device (e.g., another device in the same room communicating via WiFi or other communication network), or may be part of a video streaming to a computing device (e.g., a mobile device) via a dedicated application, web page, or plug-in of a computing device having an operating system that provides and supports the decoder-side components (810), (820), (830).

The encoded media content (825) in the elementary media bitstream can be aggregated and buffered in a temporary coded data area. The encoded media content (825) that is aggregated can include, as part of the syntax of the elementary media bitstream, one or more syntax elements that specify a bitstream property that does not completely or accurately reflect the encoding process performed. For example, as noted above, the bitstream may include an inaccurate indication of whether the bitstream was encoded using a low-latency approach. This inaccurate indication may also be the result of the encoder (820) omitting a relevant syntax element altogether (as illustrated). Nevertheless, information about the actual encoding process performed may be known and can be passed to the encoded media transmitter (830) outside of the bitstream.

The encoded media transmitter (830) receives the encoded media content (825) in the elementary bitstream, organizes the encoded media content (825) in a media file (835) (media container) according to a file format or container format (e.g., a MPEG-2 transport stream format or another file format as noted above), prepares the media file (835) for transmission as a media stream as appropriate (e.g., packetizes the encoded media content), and transmits the media file (835) over channel (840) to a decoder controller (850). In some embodiments, encryption is also applied to the elementary bitstream or the media file for digital rights management ("DRM") purposes. The channel (840) represents a communications connection (e.g., the Internet, WiFi connection, Bluetooth connection, or other wireless connection suitable for a device-to-device streaming connection as may be used, for instance, in a Miracast scenario), storage, or another channel for the output.

The decoder controller (850) represents the controller or other logic for receiving information about the encoded media to be decoded and instantiating and configuring a decoder to decode the encoded media. The decoder controller (850) can be part of the decoder itself, part of the operating system that provides and supports the decoder, or some combination thereof. In the illustrated embodiment, the decoder controller (850) controls the resources dedicated for use by the decoder and controls other performance characteristics of the decoder (e.g., what amount of memory should be dedicated for use in frame reordering and for reference frames used during decoding, and the like).

In the illustrated embodiment, the encoded media transmitter (830) further transmits an indication (837) of the low-latency encoding associated with the encoded bitstream (835). This indication (837) can be in the form of a media type attribute that is communicated to the decoder controller (850). For example, in particular embodiments, the video media provider operating the encoded media transmitter (830) can communicate with the decoder controller (850) via an application program interface ("API") for the decoder components (e.g., a Microsoft Media Foundation API). The API for the decoder can allow for certain types of information separate from the encoded bitstream to be specified and made available to the decoder controller (850). In the illustrated embodiment, the low-latency indication (837) is provided to the decoder controller (850) via the API, is separate from the encoded bitstream (and, in the illustrated embodiment, separate from the media container (media file)), and specifies information that can be used to improve one or more performance characteristics of the decoder (e.g., memory usage and/or latency during decoding). For instance, the low-latency indication (837) can be used to control the decoder and to override contradictory information specified in the bitstream. In some cases, when the low-latency indication (837) is used to control the decoder and override contradictory information, the decoder actually operates in a fashion that is not compliant with the standard, as it ignores certain specified information in the encoded bitstream (e.g., information specified in one or more syntax elements of the encoded bitstream).

As noted, the low-latency indication (837) can be a media type attribute, but can also have the form of other metadata or side data that is sent via the API. Still further, the low-latency indication (837) may be inferred or determined from other types of information that are sent via the API and that are separate from the encoded bitstream. For instance, if data sent from the encoded media transmitter (830) provides an identity of the transmitter (e.g., one or more of an IP address, device manufacturer information, device identity information, etc.), and that identity is known to be a Miracast device, then the low-latency indication (837) can be provided by this identity information through inference. A database storing data qualified to be used in making this determination (e.g., a cross-reference database) can be stored among the decoder-side components and accessed by the decoder controller (850).

The decoder controller (850) receives and processes the media file (835) to extract (remove) the bitstream of encoded media content (825) from its media container. For instance, the decoder controller (850) can de-packetize, demultiplex, and/or parse the encoded bitstream from media file content that has been aggregated for transmission as a media stream as appropriate. For example, the decoder controller (850) can buffer media file content as it is received (e.g., in a memory buffer or cache), perform the appropriate processing operations to extract the encoded bitstream from its media container, and prepare and output the encoded bitstream for continuous decoding by the decoder (860).

The decoder controller (850) further includes logic for processing the low-latency indication (837) and optimizing the decoder. For example, the decoder controller (850) can use information from the media type data (837) to control one or more performance characteristics of the decoder.

As an example, when the low-latency indication (837) is present, the decoder controller (850) can configure the decoder (860) to use a reduced number of memory resources since no memory needs to be dedicated to allow for frame reordering and/or for reference frames. Further, the decoder controller (850) can configure the decoder (860) to perform decoding for low-latency encoded video, thus reducing the latency of the decoder itself. For instance, a decoder may normally buffer many frames of video data before outputting in the expectation that frame reordering may occur. Such operations delay video display and create undesirable latency in a scenario in which low latency is desired. In configuring the decoder (860) in accordance with the low-latency indication, the decoder controller (850) can ignore or override a contrary or inconsistent signal in the bitstream itself. In practice, overriding the contrary or inconsistent signal in the bitstream can be performed by causing the decoder to ignore the signal or by actually modifying the bitstream to include a different signal (e.g., altering the syntax element for specifying low-latency encoding or adding such a syntax element when one does not currently exist).

The decoder (860) receives the encoded bitstream (825) provided by the decoder controller (850) and produces reconstructed media content (865). In the illustrated embodiment, the decoder (860) has been configured as explained to perform decoding in a low-latency decoding mode. The decoder (860) can be implemented as an operating system module, as part of an application library, as part of a standalone application, or using special-purpose hardware. A decoded frame temporary memory storage area can include a frame buffer storage area for reconstructed media content (865). The memory storage area can also be reduced and configured for low-latency performance in view of the low-latency indication (837) as described. The rendering engine (870) processes the reconstructed media content (865) for output. In example implementations, the rendering engine (870) includes, for instance, a color converter and display module.

In the illustrated embodiment, the low-latency indication (837) is separate from the encoded bitstream as well as the media file (media container). In other embodiments, however, the low-latency indication used to guide the decoder is contained in the bitstream, but is not data that is required by the video codec by which the bitstream was encoded. For instance, in some embodiments, the data used to guide the decoder in a manner as described above is included in supplemental enhancement information ("SEI") of the encoded bitstream.

Figure 9:
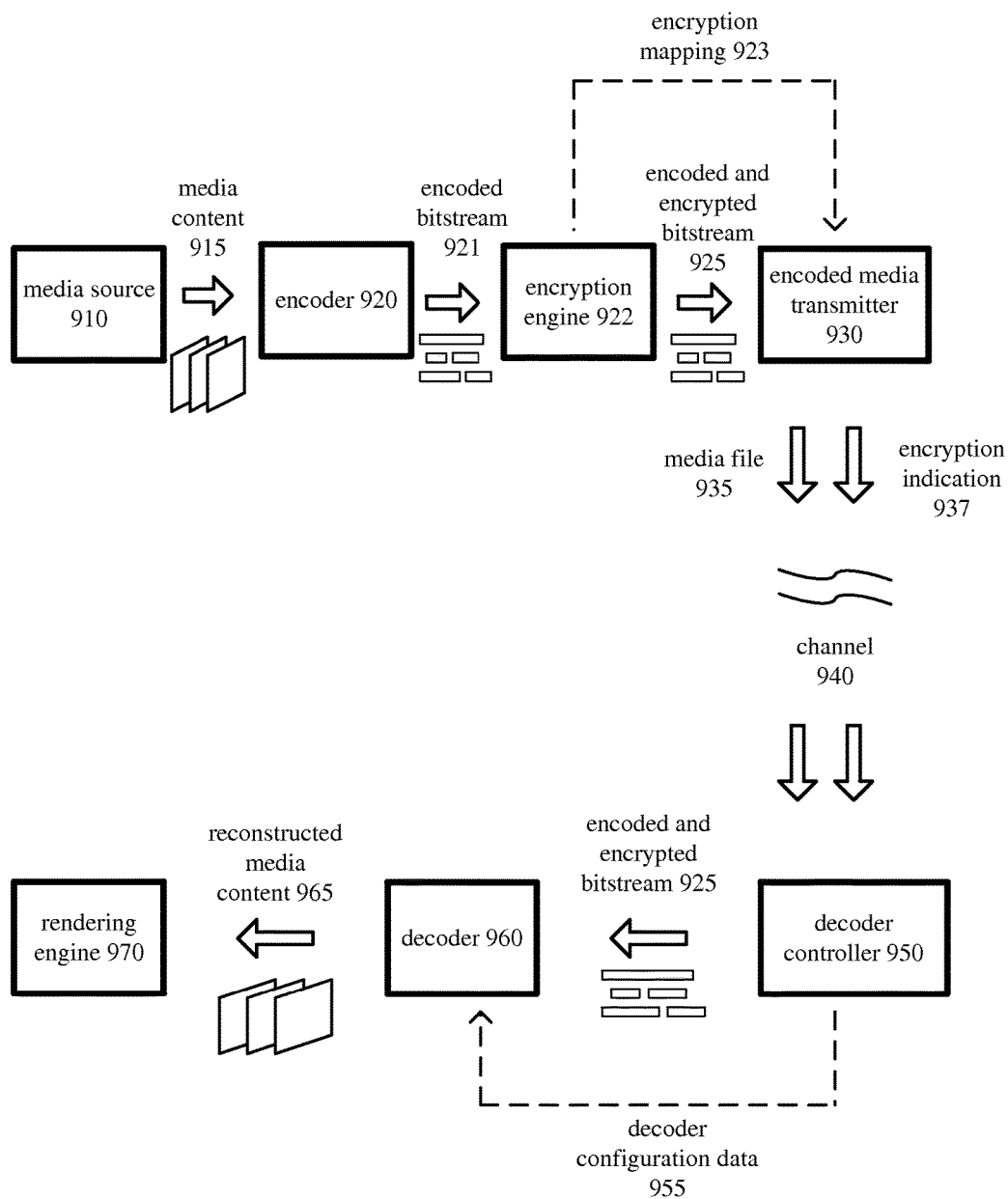

FIG. 9 is a block diagram of an example system (900) illustrating an example scenario in which standard-guided video decoding enhancements are performed. Unless otherwise stated, the function and options of the components of system (700) in FIG. 7 apply to the system (900) in FIG. 9 as well, and therefore are sometimes not repeated in this discussion. At the encoder side, the system (900) includes a media source (910), encoder (920), encryption engine (922), and encoded media transmitter (930). At the decoder side, the system (900) includes a decoder controller (950), decoder (960) and rendering engine (970).

The media source (910) provides media content (915). Before the encoder (920), the system (900) can include a buffer for storing media content (915) as well as a pre-processor that performs pre-processing (e.g., filtering) of the media content (915) before encoding. The pre-processing can also include color space conversion, color range scaling, and/or other processing.

The encoder (920) receives media content (915) provided by the media source (910) and produces encoded media content (921) in an elementary media bitstream (also referred to as encoded bitstream (921)) as output to an encryption engine (922). The encoder (920) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. Further, the encoded media content (921) can be stored on storage media for later access and transmission by the encoded media transmitter (930) (e.g., as part of a video streaming service). The encoder (920) can be implemented as an operating system module, as part of an application library, as a part of a standalone application, or using special-purpose hardware. Further, the encoder-side components (910), (920), (922), (930) may all be part of a third-party service or provider separate from the decoder-side components (950), (960), (970). For instance, the encoder-side components may be part of a video streaming service that provides on-demand video streaming to a computing device (e.g., a mobile device) via a dedicated application, web page, or plug-in of a computing device having an operating system that provides and supports the decoder-side components (910), (920), (930).

The encoded media content (921) can be aggregated and buffered in a temporary coded data area. The encoded media content (925) that is aggregated can include, as part of the syntax of the elementary media bitstream, one or more syntax elements the specify bitstream properties or attributes.

In the illustrated embodiment, the elementary media bitstream is additionally encrypted by an encryption engine (922). The encryption engine (922) can encrypt the encoded bitstream (921) using any suitable encryption standard (e.g., as part of a digital rights management ("DRM") system). For illustrative purposes, the encryption engine (922) is considered to encrypt the encoded media content (921) using the common encryption ("CENC") standard (e.g., version 1 or version 2 of the CENC). The encryption engine (922) can generate an encryption mapping (923) that is passed to the encoded media transmitter (930).

The encoded media transmitter (930) receives the encoded and encrypted bitstream (925), organizes the encoded and encrypted bitstream (925) in a media file (935) (media container) according to a file format or container format (e.g., ISO/IEC 14496-12, ASF, WebM, MKV, CFF, MPEG-4, MPEG-2, ITU-T H.222.0|ISO/IEC 13818-1, IETF RFC 3550 (RTP), or another media streaming or storage file format as noted above), packetizes the media file (935) for transmission as a media stream as appropriate, and transmits the media file (935) over channel (940) to a decoder controller (950). The channel (940) represents a communications connection (e.g., over the Internet), storage, or another channel for the output.

The decoder controller (950) represents the controller or other logic for receiving information about the encoded media to be decoded and instantiating and configuring a decoder to decode the encoded media. The decoder controller (950) can be part of the decoder itself, part of the operating system that provides and supports the decoder, or some combination thereof. In the illustrated embodiment, the decoder controller (950) controls the resources dedicated for use by the decoder and controls other performance characteristics of the decoder (e.g., how start code searches are performed, and the like).

In the illustrated embodiment, the encoded media transmitter (930) further transmits an indication (937) that the bitstream being transmitted is encrypted according to a particular standard. This indication (937) can be in the form of a media type attribute that is communicated to the decoder controller (950). For example, in particular embodiments, the video media provider operating the encoded media transmitter (930) can communicate with the decoder controller (950) via an application program interface ("API") for the decoder components (e.g., a Microsoft Media Foundation API). The API for the decoder can allow for certain types of information separate from the encoded bitstream to be specified and made available to the decoder controller (950). In the illustrated embodiment, the encryption indication (937) is provided to the decoder controller (950) via the API, is separate from the encoded bitstream (and, in the illustrated embodiment, separate from the media container (media file)), and specifies information that can be used to improve one or more performance characteristics of the decoder (e.g., how start code searching is performed).

As noted, the encryption indication (937) can be a media type attribute, but can also have the form of other metadata or side data that is sent via the API. Still further, the encryption indication (937) may be inferred or determined from other types of information that are sent via the API and that are separate from the encoded bitstream. For instance, if data sent from the encoded media transmitter (930) provides an identity of the transmitter (e.g., one or more of an IP address, device manufacturer information, device identity information, etc.), and that identity is known to transmit video media in an encrypted format, then the encryption indication (937) can be provided by this identity information through inference. A database storing data qualified to be used in making this determination (e.g., a cross-reference database) can be stored among the decoder-side components and accessed by the decoder controller (950).

The decoder controller (950) receives and processes the media file (935) to extract (remove) the encoded and encrypted bitstream (925) from its media container (e.g., media file (935)). For instance, the decoder controller (950) can de-packetize, demultiplex, and/or parse the encoded and encrypted bitstream from media file content that has been aggregated for transmission as a media stream. For example, the decoder controller (950) can buffer media file content as it is received (e.g., in a memory buffer or cache), perform the appropriate processing operations to extract the encoded and encrypted bitstream from its media container, and prepare and output the encoded and encrypted bitstream for continuous decoding by the decoder (960).

The decoder controller (950) further includes logic for processing the encryption indication (937) and optimizing the decoder. For example, the decoder controller (950) can use the encryption indication (937) to control one or more performance characteristics of the decoder.

As an example, when the encryption indication (937) includes an indication that the encoded and encrypted bitstream was encrypted according to a particular standard, the decoder controller (950) can configure the decoder (960) (via decoder configuration data (955)) to perform start code searching in a manner adapted for the encryption standard. For instance, the CENC encryption standard specifies that start codes are not to be present in any encrypted portions of the bitstream and instead appear in the "clean" portions (or chunks). The default behavior of the decoder, however, may be to search all available portions of the bitstream for the search codes, thus resulting in needless, computationally instensive operations. In the presence of the encryption indication (937), the decoder controller (950) can modify the behavior of the decoder (960) such that a start code search is performed in the unencrypted portions of the bitstream and that no searching (or minimal (or reduced) searching) is performed in the encrypted portion, greatly increasing decoder efficiency and reducing processor and memory usage.

The encoded and encrypted bitstream (925) that is output from the decoder controller (950) is stored in a temporary coded data area until a sufficient quantity of such data has been received. The decoder (960) receives the encoded and encrypted bitstream (925) provided by the decoder controller (950) and produces reconstructed media content (965). The decoder (960) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder (960) can be implemented as an operating system module, as part of an application library, as part of a standalone application, or using special-purpose hardware. Further, in the illustrated embodiment, the decoder (960) is adapted to decrypt the encoded and encrypted bitstream according to the specified encryption standard.

A decoded frame temporary memory storage area can include multiple frame buffer storage areas for reconstructed media content (965). The rendering engine (970) processes the reconstructed media content (965) for output. In example implementations, the rendering engine (970) includes, for instance, a color converter and display module.

In the illustrated embodiment, the encryption indication (937) is separate from the encoded and encrypted bitstream as well as the media file (media container). In other embodiments, however, the encryption indication used to guide the decoder is contained in the bitstream, but is not data that is required by the video codec by which the bitstream was encoded. For instance, in some embodiments, the data used to guide the decoder in a manner as described above is included in supplemental enhancement information ("SEI") of the encoded and encrypted bitstream.

Figure 10:
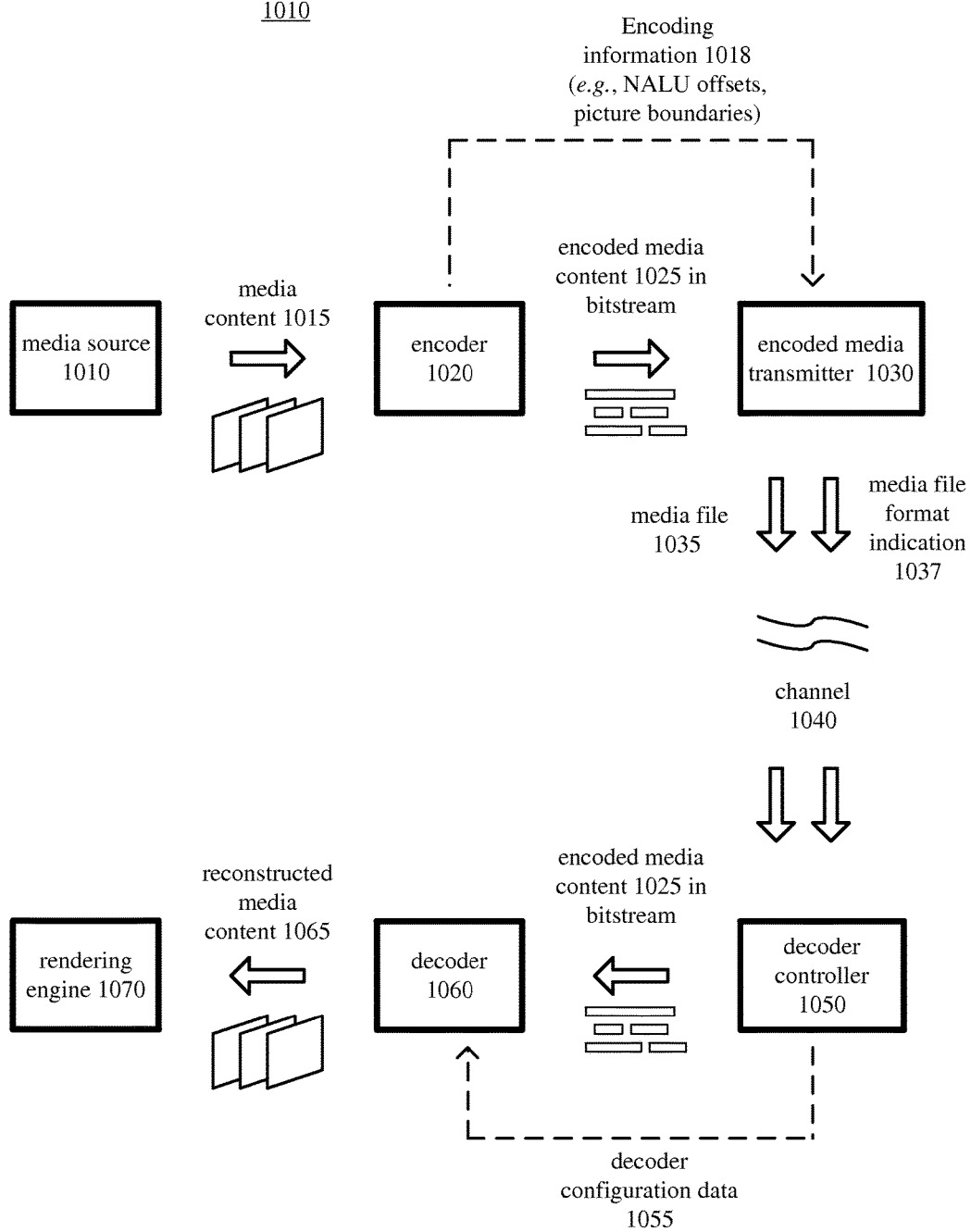

FIG. 10 is a block diagram of an example system (1000) illustrating another example scenario in which standard-guided video decoding enhancements are performed. Unless otherwise stated, the function and options of the components of system (700) in FIG. 7 apply to the system (1000) in FIG. 10 as well, and therefore are sometimes not repeated in this discussion. At the encoder side, the system (1000) includes a media source (1010), encoder (1020), and encoded media transmitter (1030). At the decoder side, the system (1000) includes a decoder controller (1050), decoder (1060) and rendering engine (1070).

The media source (1010) provides media content (1015). Before the encoder (1020), the system (1000) can include a buffer for storing media content (1015) as well as a pre-processor that performs pre-processing (e.g., filtering) of the media content (1015) before encoding. The pre-processing can also include color space conversion, color range scaling, and/or other processing.

The encoder (1020) receives media content (1015) provided by the media source (1010) and produces encoded media content (1025) in an elementary media bitstream (also referred to as encoded bitstream (1025)) as output for the encoded media transmitter (1030). The encoder (1020) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. Further, the encoded media content (1025) can be stored on storage media for later access and transmission by the encoded media transmitter (1030) (e.g., as part of a video streaming service). The encoder (1020) can be implemented as an operating system module, as part of an application library, as a part of a standalone application or using special-purpose hardware. Further, the encoder-side components (1010), (1020), (1030) may all be part of a third-party service or provider separate from the decoder-side components (1050), (1060), (1070). For instance, the encoder-side components may be part of a video streaming service that provides on-demand video streaming to a computing device (e.g., a mobile device) via a dedicated application, web page, or plug-in of a computing device having an operating system that provides and supports the decoder-side components (1010), (1020), (1030).

The encoded media content (1025) can be aggregated and buffered in a temporary coded data area. The encoded media content (1025) that is aggregated can include, as part of the syntax of the elementary media bitstream, one or more syntax elements the specify bitstream properties or attributes. Further, in the illustrated embodiment, the encoder (1020) can produce certain encoding information (1018) that is passed to the encoded media transmitter (1030), either as part of the bitstream or separately. For instance, in the illustrated embodiment, the encoding information (1018) includes information specifying network abstraction layer unit ("NALU") length, picture boundaries, and/or access unit boundaries.

The encoded media transmitter (1030) receives the encoded bitstream (1025), organizes the encoded bitstream (1025) in a media file (1035) (also referred to as a media container) according to a media file format (also referred to as a file format or container format), packetizes the media file (1035) for transmission as a media stream as appropriate, and transmits the media file (1035) over channel (1040) to a decoder controller (1050). The file format used can be selected from a variety of formats, including ISO/IEC 14496-12, ASF, WebM, MKV, CFF, MPEG-4, MPEG-2, ITU-T H.222.0|ISO/IEC 13818-1, IETF RFC 3550 (RTP), or another media streaming or storage file format as noted above. File formats vary in their content and arrangement of information. Some file formats specify that certain data be included in the media file separately from the encoded bitstream. Although such data is normally unused by the decoder, embodiments of the disclosed technology use such data to enhance decoder performance. For instance, for media files in an MPEG-4, MKV, CFF, or RTP format, data is contained in the media file specifying NALU offsets, picture boundaries, and/or access unit boundaries. In some embodiments, encryption is also applied to the elementary bitstream or the container for digital rights management ("DRM") purposes.

The channel (1040) represents a communications connection (e.g., over the Internet), storage, or another channel for the output. The decoder controller (1050) represents the controller or other logic for receiving information about the encoded media to be decoded and instantiating and configuring a decoder to decode the encoded media. The decoder controller (1050) can be part of the decoder itself, part of the operating system that provides and supports the decoder, or some combination thereof. In the illustrated embodiment, the decoder controller (1050) controls the resources dedicated for use by the decoder and controls other performance characteristics of the decoder (e.g., how start code searches are performed, and the like).

In the illustrated embodiment, the encoded media transmitter (1030) further transmits an indication (1037) that the media file being transmitted is in a particular media file format. This indication (1037) can be in the form of a media type attribute that is communicated to the decoder controller (1050). For example, in particular embodiments, the video media provider operating the encoded media transmitter (1030) can communicate with the decoder controller (1050) via an application program interface ("API") for the decoder components (e.g., a Microsoft Media Foundation API). The API for the decoder can allow for certain types of information separate from the encoded bitstream (and separate from the media file comprising the encoded bitstream) to be specified and made available to the decoder controller (1050). In the illustrated embodiment, the media file format indication (1037) is provided to the decoder controller (1050) via the API, is separate from the media file and the encoded bitstream, and specifies information that can be used to improve one or more performance characteristics of the decoder (e.g., how start code searching is performed).

As noted, the media file format indication (1037) can be a media type attribute, but can also have the form of other metadata or side data that is sent via the API. Still further, the media file format indication (1037) may be inferred or determined from other types of information that are sent via the API and that are separate from the media file. For instance, if data sent from the encoded media transmitter (1030) provides an identity of the transmitter (e.g., one or more of an IP address, device manufacturer information, device identity information, etc.), and that identity is known to transmit video media in a particular media file format, then the media file format indication (1037) can be provided by this identity information through inference. A database storing data qualified to be used in making this determination (e.g., a cross-reference database) can be stored among the decoder-side components and accessed by the decoder controller (1050).

The decoder controller (1050) receives and processes the media file (1025) to extract (remove) the encoded bitstream (1025) from its media container. For instance, the decoder controller (1050) can de-packetize, demultiplex, and/or parse the encoded bitstream from the media file content that has been aggregated for transmission as a media stream. For example, the decoder controller (1050) can buffer media file content as it is received (e.g., in a memory buffer or cache), perform the appropriate processing operations to extract the encoded bitstream from its media container, and prepare and output the encoded bitstream for continuous decoding by the decoder (1060).

The decoder controller (1050) further includes logic for processing the media file format indication (1037) and optimizing the decoder. For example, the decoder controller (1050) can use the media file format indication (1037) to control one or more performance characteristics of the decoder.

As an example, when the media file format indication (1037) includes an indication that the media file was created according to a particular file format standard, the decoder controller (1050) can configure the decoder (1060) (via decoder configuration data (1055)) to perform start code searching in a manner adapted for the media file format. For instance, certain file formats specify that selected encoding information be present in the media file, albeit separate from the encoded bitstream (encoded according to a particular codec standard) itself. For instance, media files arranged according to the MPEG-4, MKV, RTP, and CFF file formats include data specifying, among other things, NALU offsets, picture boundaries, and/or access unit boundaries separately from the encoded bitstream itself. The default behavior of the decoder, however, is ordinarily to separately search for NALU length data, picture boundary data, or access unit boundary data for each NALU, picture, or access unit. This default behavior results in needless, computationally intensive operations. In the presence of the media file format indication (1037), the decoder controller (1050) can modify the behavior of the decoder (1060) such that the NALU length (or offset) data, picture boundary data, or access unit boundary data available in the media file (1025) is used and applied to multiple NALUs, pictures, or access units (e.g., to all NALUs, pictures, or access units) in the encoded bitstream, greatly increasing decoder efficiency and reducing processor and memory usage.

The encoded bitstream (1025) that is output from the decoder controller (1050) is stored in a temporary coded data area until a sufficient quantity of such data has been received. The decoder (1060) receives the encoded bitstream (1025) provided by the decoder controller (1050) and produces reconstructed media content (1065). The decoder (1060) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder (1060) can be implemented as an operating system module, as part of an application library, as part of a standalone application, or using special-purpose hardware. Further, in the illustrated embodiment, the decoder (1060) is adapted to decrypt the encoded bitstream according to the specified encryption standard.

A decoded frame temporary memory storage area can include multiple frame buffer storage areas for reconstructed media content (1065). The rendering engine (1070) processes the reconstructed media content (1065) for output. In example implementations, the rendering engine (1070) includes, for instance, a color converter and display module.

In the illustrated embodiment, the media file format indication (1037) is separate from the encoded bitstream as well as the media file (media container). In other embodiments, however, the media file format indication used to guide the decoder is contained in the bitstream, but is not data that is required by the video codec by which the bitstream was encoded. For instance, in some embodiments, the data used to guide the decoder in a manner as described above is included in supplemental enhancement information ("SEI") of the encoded bitstream.

FIGS. 11-15 are flow charts illustrating example embodiments of the disclosed technology. The flow charts of 11-15 are not to be construed as limiting, but instead illustrate aspects of the disclosed technology that can be realized in various embodiments and scenarios.

Figure 11:
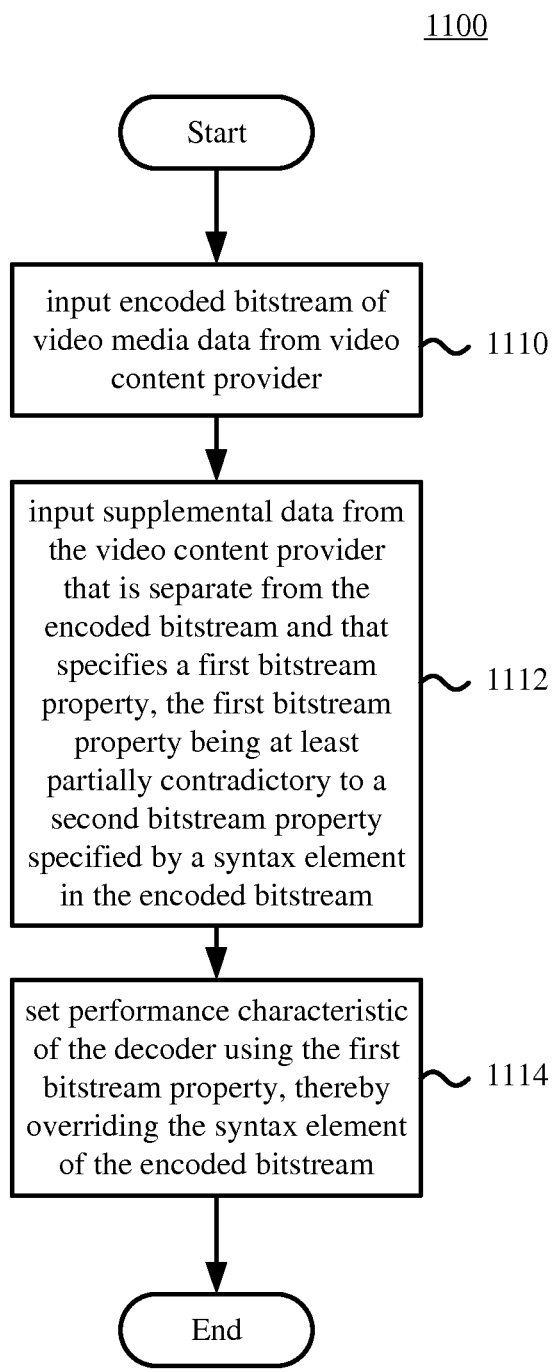
FIGS. 11-15 are flowcharts illustrating techniques for enhancing video decoder performance by using application-specific or standard-specific information according to embodiments of the disclosed technology.

FIG. 11 is a flow chart (1100) showing an example embodiment for implementing a decoding technique according to the disclosed technology. The particular operations or sequence of operations should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools. The method acts illustrated in flowchart (1100) are performed during decoding of digital video media and are typically performed by a video decoder or decoder system.

At (1110), an encoded bitstream of video media data is input from a video content provider. At (1112), supplemental data from the video content provider is input that is separate from the encoded bitstream and that specifies a first bitstream property. Further, in this embodiment, the encoded bitstream includes a syntax element specifying a second bitstream property that at least in part contradicts the first bitstream property. At (1114), a performance characteristic of the decoder is set using the first bitstream property without using the second bitstream property, thereby overriding the contradictory syntax element from the encoded bitstream.

In certain embodiments, the decoder is an operating system decoder and communicates with an application written by the video content provider via an application program interface for the operating system decoder. Further, the supplemental data can be input as part of a media type attribute via the application program interface and be separate from the encoded bitstream. The supplemental data can be based on knowledge of the video content provider external of the encoded bitstream. In some embodiments, the supplemental data is also separate from a media file containing the encoded bitstream. In one example scenario, the supplemental data indicates that the bitstream is for progressive-display-format video and the contradictory syntax element indicates that the bitstream is for interlaced-display-format video. In this scenario, the setting the performance characteristic of the decoder can comprise reserving less memory for the decoder than would otherwise be reserved for decoding interlaced-display-format video and/or reducing latency during decoding. In another scenario, the supplemental data indicates that the bitstream is encoded according to a constrained baseline profile and the contradictory syntax element indicates that the bitstream is encoded according to a baseline profile. In this scenario, the setting the performance characteristic of the decoder can comprise setting the decoder to decode the encoded bitstream using custom decoding hardware specially configured to decode constrained baseline profile video. In another scenario, the supplemental data indicates that the bitstream was encoded for low-latency streaming and the contradictory syntax element is either (a) the absence of any indication that the bitstream was encoded for low-latency streaming, or (b) an indication that the bitstream was not encoded for low-latency. In this scenario, the setting the performance characteristic of the decoder can comprise reserving less memory for the decoder to account for frame reordering and buffering than would otherwise be reserved by the decoder and/or reducing latency during decoding.

Figure 12:
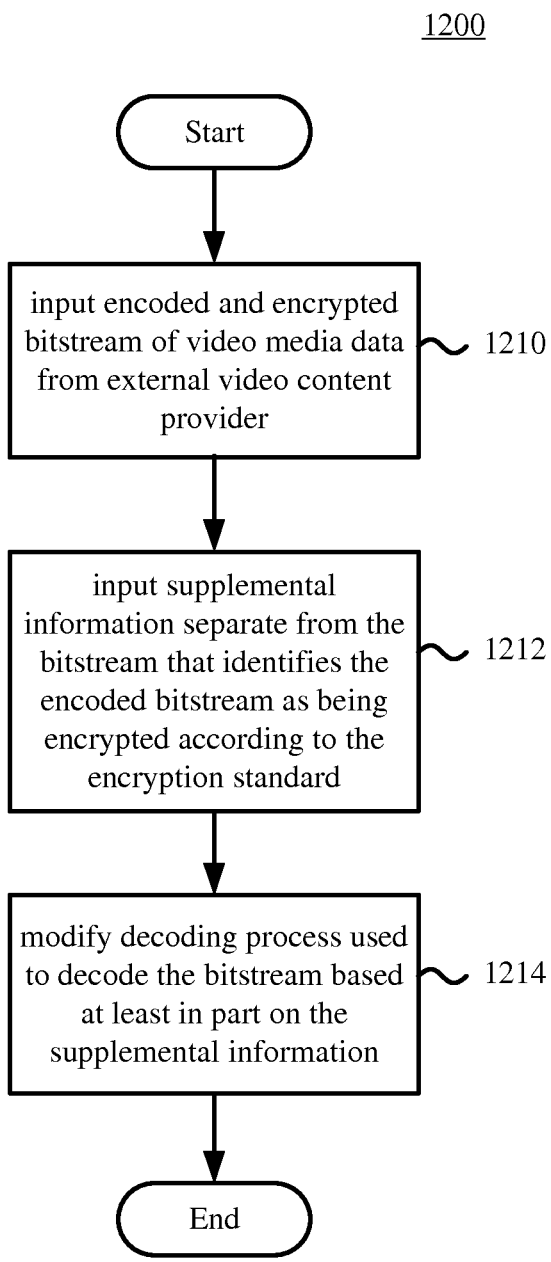

FIG. 12 is a flow chart (1200) showing another example embodiment for implementing a decoding technique according to the disclosed technology. The particular operations or sequence of operations should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools. The method acts illustrated in flowchart (1200) are performed during decoding of digital video media and are typically performed by a video decoder or decoder system.

At (1210), an encoded and encrypted bitstream of video media data from an external video content provider is input, the encoded bitstream encoded according to a video codec standard and encrypted according to an encryption standard. At (1212), supplemental information is input that is separate from the encoded and encrypted bitstream and that identifies the encoded bitstream as being encrypted according to the encryption standard (e.g., the Common Encryption Scheme ("CENC")). At (1214), a decoding process used to decode the encoded and encrypted bitstream is modified based at least in part on the supplemental information.

In certain embodiments, the modifying reduces start code search time in the decoding process. For instance, the modifying the decoding process can comprise modifying the decoding process such that it searches for start codes only in the unencrypted bytes of the encoded and encrypted bitstream and omits searching in encrypted bytes of the encoded and encrypted bitstream. The modifying can override default behavior of the decoding process. In some embodiments, the supplemental data is also separate from a media file containing the encoded and encrypted bitstream.

Figure 13:
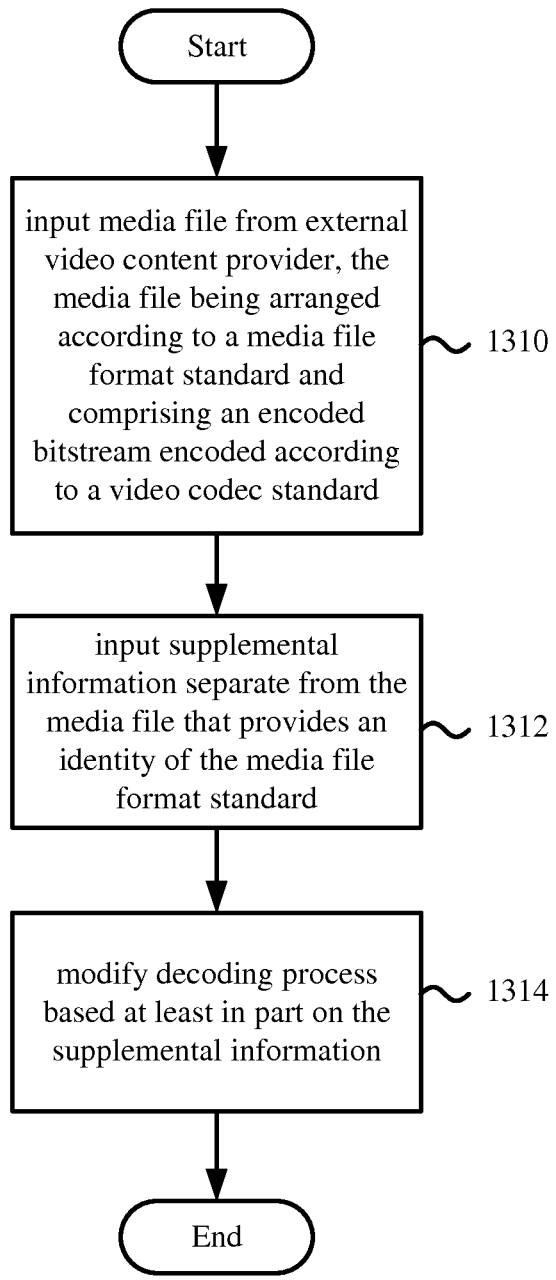

FIG. 13 is a flow chart (1300) showing another example embodiment for implementing a decoding technique according to the disclosed technology. The particular operations or sequence of operations should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools. The method acts illustrated in flowchart (1300) are performed during decoding of digital video media and are typically performed by a video decoder or decoder system.

At (1310), a media file from an external video content provider is input, the media file being arranged according to a media file format standard (e.g., one of MPEG-4, MKV, CFF, RTP, and the like) and comprising an encoded bitstream encoded according to a video codec standard. At (1312), supplemental information is input that is separate from the media file and that provides an identity of the media file format standard by which the media file was assembled. At (1314), a decoding process used to decode the encoded bitstream is modified based at least in part on the supplemental information.

In certain embodiments, the modifying reduces start code search time in the decoding process. For example, the modifying can comprise modifying the decoding process to: identify a network abstract layer unit ("NALU") length from data in the media file separate from the encoded bitstream; and apply the identified NALU length to multiple NALUs (e.g., all NALUs) in the encoded bitstream, and thereby omit performance of separate start code searches for each NALU in the encoded bitstream. In some embodiments, the modifying can comprise modifying the decoding process to: identify picture and access unit boundaries from data in the media file separate from the encoded bitstream; and apply the identified picture and access boundaries to multiple pictures and access units (e.g., all pictures and access units) in the encoded bitstream, and thereby omit performance of separate start code searches for each picture and access unit in the encoded bitstream. The modifying can override the default behavior of the decoding process.

Figure 14:
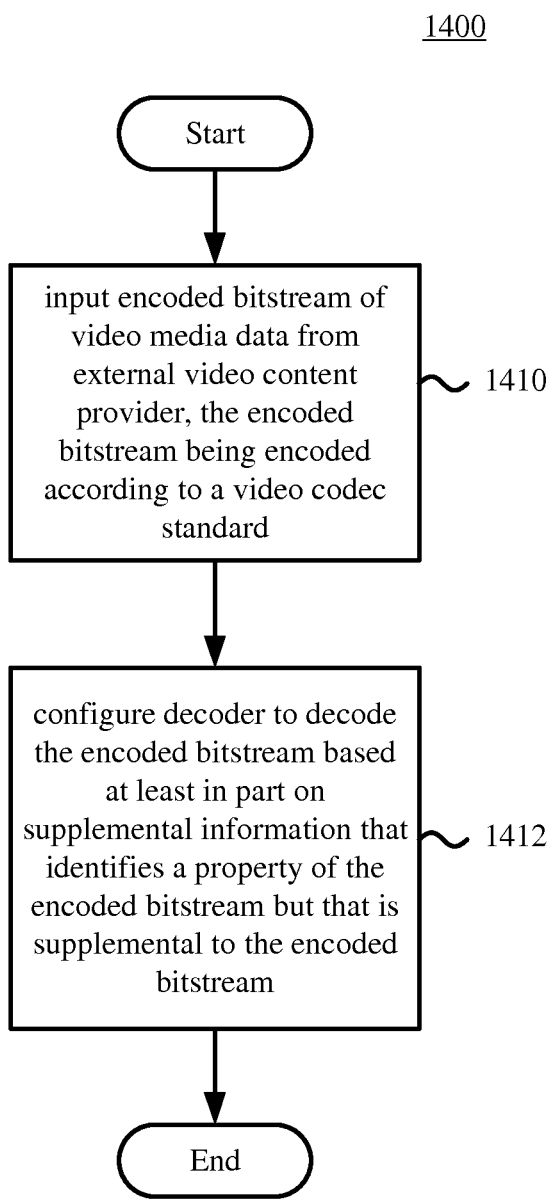

FIG. 14 is a flow chart (1400) showing another example embodiment for implementing a decoding technique according to the disclosed technology. The particular operations or sequence of operations should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools. The method acts illustrated in flowchart (1400) are performed during decoding of digital video media and are typically performed by a video decoder or decoder system.

At (1410), an encoded bitstream of video media data is input from an external video content provider, the encoded bitstream being encoded according to a video codec standard. At (1412), a decoder is configured to decode the encoded bitstream based at least in part on supplemental information that identifies a property of the encoded bitstream but that is supplemental to the encoded bitstream.

In certain embodiments, the decoder is an operating system decoder, and the supplemental information is received through an application program interface for the operating system decoder and included in metadata separate from the encoded bitstream. The supplemental information can be included as a media type attribute received through the application program interface. The supplemental information can be received via a plug-in that has been customized for use with the decoder by the external video content provider. The configuring the decoder can override default behavior of the decoder. In particular implementations, the supplemental information is inconsistent with one or more syntax elements in the bitstream, and the configuring the decoder comprises causing the decoder to ignore the one or more syntax elements that are inconsistent with the supplemental information. In other implementations, the supplemental information is inconsistent with one or more syntax elements in the bitstream, and the configuring the decoder comprises modifying the one or more syntax elements in the encoded bitstream and providing the modified bitstream to the decoder. In some embodiment, the configuring the decoder causes the decoder to use customized decoding hardware that the decoder would not use by default for the encoded bitstream, to reserve less memory for frame reordering or buffering than the decoder would by default for the encoded bitstream, and/or to omit one or more start code searches that the decoder would perform by default for the encoded bitstream.

Figure 15:
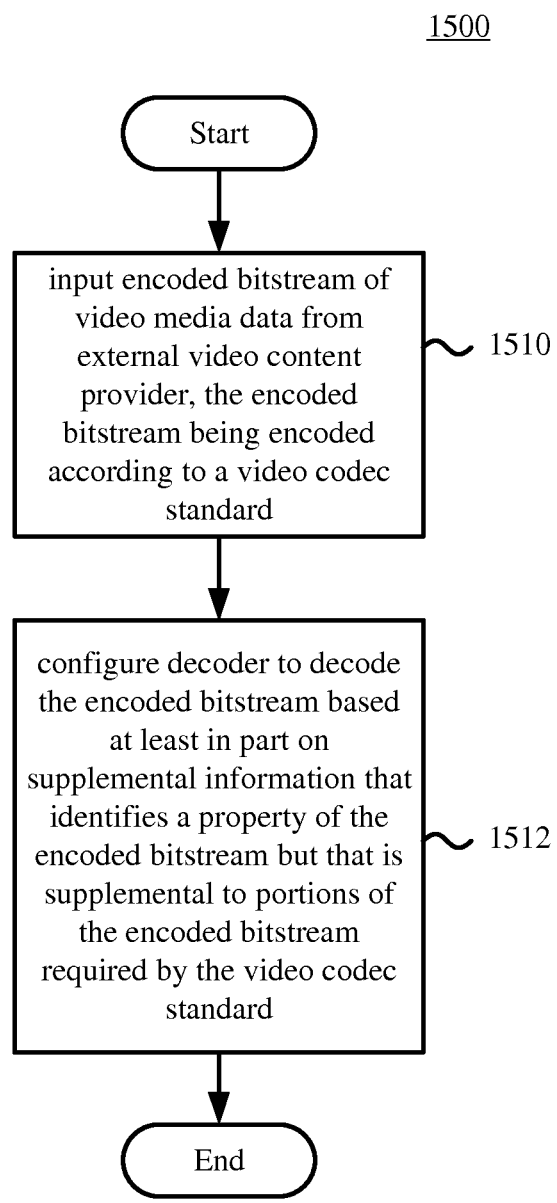

FIG. 15 is a flow chart (1500) showing another example embodiment for implementing a decoding technique according to the disclosed technology. The particular operations or sequence of operations should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools. The method acts illustrated in flowchart (1500) are performed during decoding of digital video media and are typically performed by a video decoder or decoder system.

At (1510), an encoded bitstream of video media data is input from an external video content provider, the encoded bitstream being encoded according to a video codec standard. At (1512), a decoder is configured to decode the encoded bitstream based at least in part on supplemental information that identifies a property of the encoded bitstream but that is supplemental to portions of the encoded bitstream required by the video codec standard.

In certain embodiments, the supplemental information is included as supplemental enhancement information in the encoded bitstream. In some embodiments, the configuring the decoder overrides default behavior of the decoder. In certain embodiments, the supplemental information is inconsistent with one or more syntax elements in the bitstream, and wherein the configuring the decoder comprises causing the decoder to ignore or modify the one or more syntax elements that are inconsistent with the supplemental information.

VIII. CONCLUDING REMARKS

Having illustrated and described the principles of the disclosed technology, it will be apparent to those skilled in the art that the disclosed embodiments can be modified in arrangement and detail without departing from such principles. For example, any one or more aspects of the disclosed technology can be applied in other embodiments and environments. Additionally, the disclosed technology is not limited to use with any particular video codec standard, but can be adapted for use in connection with any suitable video codec or video application.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope and spirit of these claims and their equivalents.

What is claimed is:

1. A video decoding system, comprising:
a decoder configured to perform video decoding operations; and
a decoder controller configured to operate the decoder, the decoder controller being further configured to:
input a media file from an external video content provider, the media file arranged according to a media file format standard and comprising an encoded bitstream encoded according to a video codec standard;
input supplemental information that is both separate from the encoded bitstream and separate from the media file and that further directly identifies an identity of the media file format standard by which the media file was assembled; and
modify, based at least in part on the supplemental information, a decoding process performed by the decoder to decode the encoded bitstream.

2. The video decoding system of claim 1, wherein the modifying reduces start code search time in the decoding process performed by the decoder.

3. The video decoding system of claim 1, wherein the modifying comprises modifying the decoding process performed by the decoder to:
identify a network abstraction layer unit ("NALU") length from data in the media file separate from the encoded bitstream; and
apply the identified NALU length to multiple NALUs in the encoded bitstream, and thereby omit performance of separate start code searches for each NALU in the encoded bitstream.

4. The video decoding system of claim 1, wherein the modifying comprises modifying the decoding process performed by the decoder to:
identify picture and access unit boundaries from data in the media file separate from the encoded bitstream; and
apply the identified picture and access boundaries to multiple pictures and access units in the encoded bitstream, and thereby omit performance of separate start code searches for each picture and access unit in the encoded bitstream.

5. The video decoding system of claim 1, wherein the modifying overrides default behavior of the decoding process performed by the decoder.

6. The video decoding system of claim 1, wherein the media file format standard is one of MPEG-4, MKV, RTP, or CFF.

7. One or more tangible memory or storage devices storing computer-executable instructions which when executed by a computing device cause the computing device to perform video processing operations comprising:
inputting an encoded bitstream of video media data from an external video content provider, the encoded bitstream encoded according to a video codec standard; and
configuring a decoder to decode the encoded bitstream, the configuring being based at least in part on supplemental information that identifies a property of the encoded bitstream but that is separate from the encoded bitstream and separate from a media container containing the encoded bitstream.

8. The one or more tangible memory or storage devices-of claim 7, wherein the decoder is an operating system decoder, and wherein the supplemental information is received through an application program interface for the operating system decoder and included in metadata separate from the encoded bitstream.

9. The one or more tangible memory or storage devices-of claim 8, wherein the supplemental information is included as a media type attribute received through the application program interface.

10. The one or more tangible memory or storage devices-of claim 7 wherein the supplemental information is received via a plug-in that has been customized for use with the decoder by the external video content provider.

11. The one or more tangible memory or storage devices of claim 7, wherein the configuring the decoder overrides default behavior of the decoder.

12. The one or more tangible memory or storage devices of claim 7, wherein the supplemental information is inconsistent with one or more syntax elements in the bitstream, and wherein the configuring the decoder comprises causing the decoder to ignore the one or more syntax elements that are inconsistent with the supplemental information.

13. The one or more tangible memory or storage devices of claim 7, wherein the supplemental information is inconsistent with one or more syntax elements in the bitstream, and wherein the configuring the decoder comprises modifying the one or more syntax elements in the encoded bitstream and providing the modified bitstream to the decoder.

14. The one or more tangible memory or storage devices of claim 7, wherein the configuring the decoder causes the decoder to use customized decoding hardware that the decoder would not use by default for the encoded bitstream.

15. The one or more tangible memory or storage devices of claim 7, wherein the configuring the decoder causes the decoder to reserve less memory for frame reordering or buffering than the decoder would by default for the encoded bistream.

16. The one or more tangible memory or storage devices of claim 7, wherein the configuring the decoder causes the decoder to omit one or more start code searches that the decoder would perform by default for the encoded bitstream.

17. A method, comprising:
    by a decoding system:
        inputting an encoded bitstream of video media data from an external video content provider, the encoded bitstream encoded according to a video codec standard; and
        configuring a decoder to decode the encoded bitstream, the configuring being based at least in part on supplemental information that identifies a property of the encoded bitstream but that is separate from the encoded bitstream and also separate from a media container containing the encoded bitstream.

18. The method of claim 17, wherein the supplemental information is inconsistent with one or more syntax elements in the bitstream.

19. The method of claim 17, wherein the configuring the decoder overrides default behavior of the decoder.

20. The method of claim 17, wherein the supplemental information is inconsistent with one or more syntax elements in the bitstream, and wherein the configuring the decoder comprises causing the decoder to ignore or modify the one or more syntax elements that are inconsistent with the supplemental information.

* * * * *